(12) United States Patent
Weissmann

(10) Patent No.: US 6,675,643 B2
(45) Date of Patent: Jan. 13, 2004

(54) CONTAINER VOLUME MEASURING DEVICE AND METHOD

(76) Inventor: Dan Weissmann, 16 Windham Dr., Simsbury, CT (US) 06070

( * ) Notice: Subject to any disclaimer, the term of this patent is extended or adjusted under 35 U.S.C. 154(b) by 217 days.

(21) Appl. No.: 10/024,161

(22) Filed: Dec. 18, 2001

(65) Prior Publication Data

US 2002/0095982 A1 Jul. 25, 2002

Related U.S. Application Data

(60) Provisional application No. 60/263,352, filed on Jan. 22, 2001.

(51) Int. Cl.$^7$ .............................................. G01F 17/00
(52) U.S. Cl. ........................................................ 73/149
(58) Field of Search ...................... 73/149, 429; 33/1 V

(56) References Cited

U.S. PATENT DOCUMENTS

| | | | | |
|---|---|---|---|---|
| 2,270,505 A | * | 1/1942 | Burleson ...................... | 73/149 |
| 4,715,221 A | * | 12/1987 | Grims et al. .................. | 73/149 |
| 4,872,489 A | * | 10/1989 | Erhart ......................... | 73/149 |
| 4,899,573 A | * | 2/1990 | Dimmick et al. ............. | 73/149 |
| 5,319,957 A | | 6/1994 | Stieger et al. ................ | 73/49.2 |
| 5,583,897 A | * | 12/1996 | Hill ............................. | 73/149 |
| 5,865,225 A | | 2/1999 | Weiss .......................... | 141/198 |

* cited by examiner

Primary Examiner—Robert R Raevis
(74) Attorney, Agent, or Firm—Michael J. Weins; Jeffrey E. Semprebon

(57) ABSTRACT

The volume measuring device has a reservoir of known volume attached to a measuring tube. The measuring tube is also attached to a container mount configured to sealably engage a container. Liquid partially fills the measuring tube and the volume of liquid contained therein can be measured by measuring its height. The measuring tube pivots between two measuring orientations. In the first measuring orientation, the volume of liquid in the measuring tube equals the total volume of liquid minus the volume of the reservoir. In the second measuring orientation, the volume of liquid in the measuring tube equals the total volume minus the volume of the container. Thus, the difference in the volume of liquid contained in the measuring tube in the two orientations equals the difference between the known volume of the reservoir and the unknown volume of the container, and the volume of the container can be calculated.

20 Claims, 13 Drawing Sheets

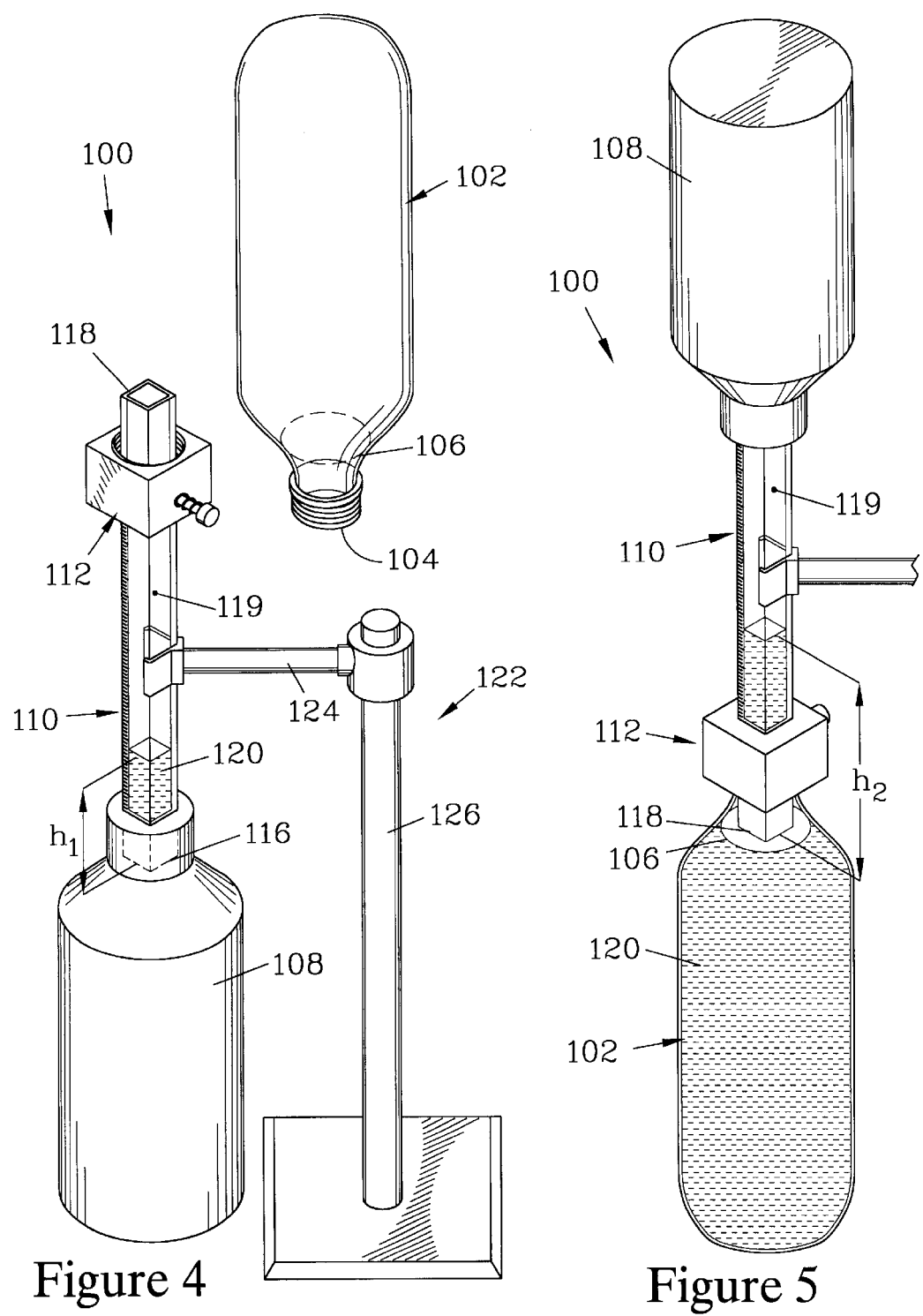

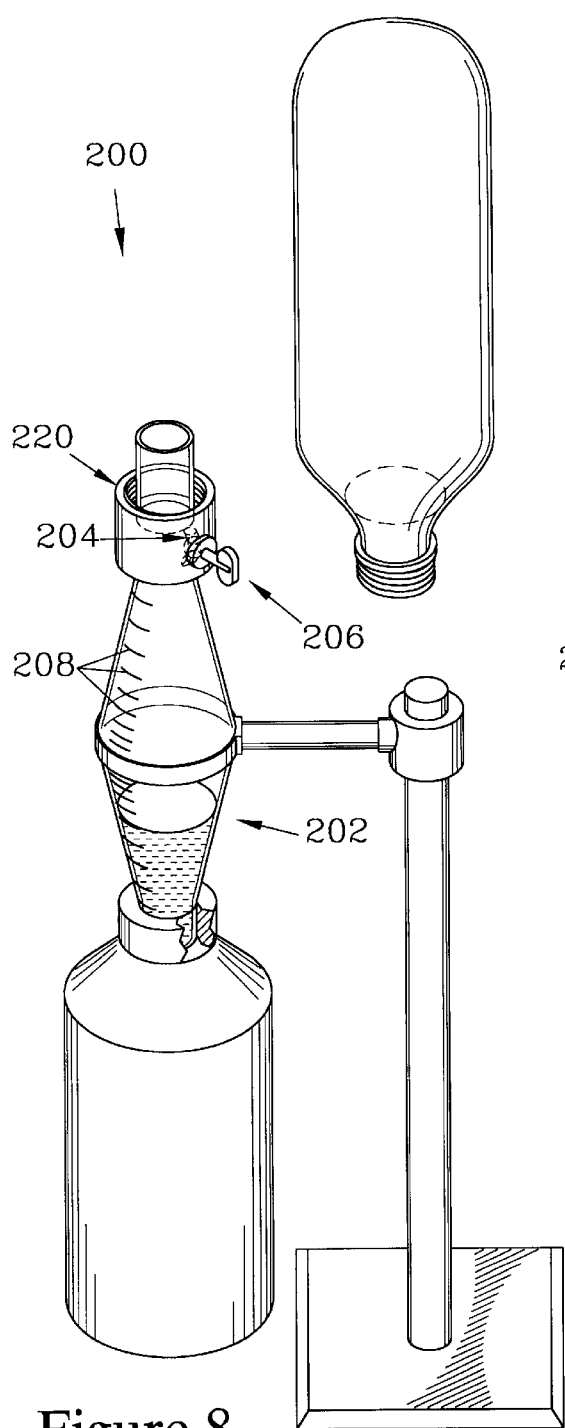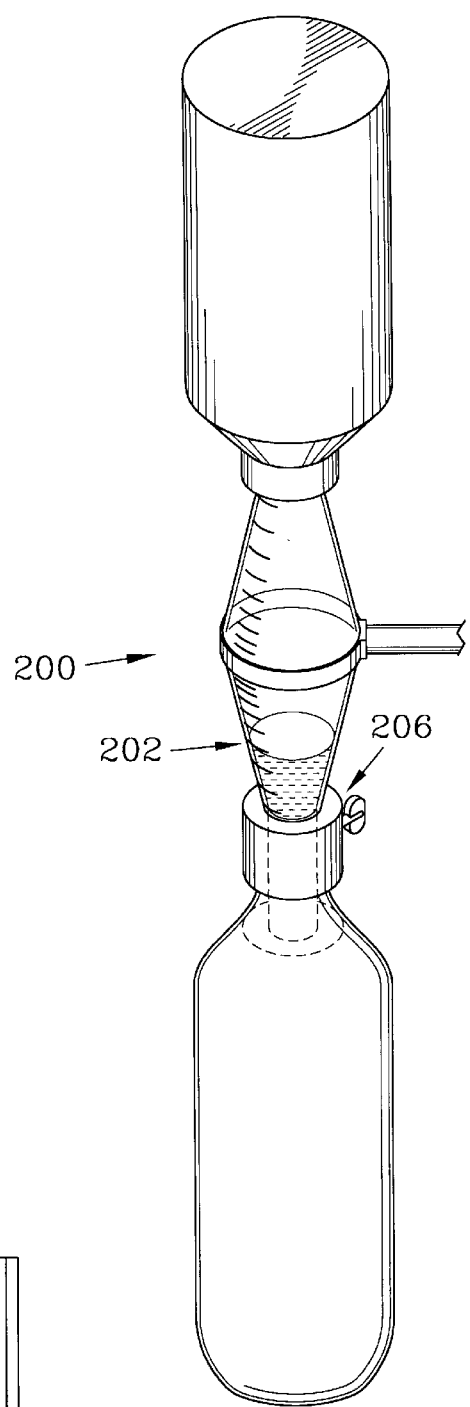
Figure 8
Figure 9

CONTAINER VOLUME MEASURING DEVICE AND METHOD

FIELD OF THE INVENTION

The present invention relates to a device for measuring the volume of containers such as jars or bottles for quality control purposes, and a method for measuring the volume of the same.

BACKGROUND OF THE INVENTION

Containers are formed by various methods of production and from various materials. Plastic containers can be formed by introducing a desired amount of material into a mold and then blowing air into the material to force it against the walls of the mold (blow molding) or by pulling a vacuum between the mold and the material to pull the material to the wall (thermoforming). Alternately, containers can be made by the injection molding process, or rotomolding. For glass containers, glass blowing is frequently used, as is well known and discussed in the patent art. Containers can also be fabricated from metal or other materials by various methods.

In the container manufacturing industry, it has been the practice to maintain consistency in the production of containers to assure that they meet the targeted volume capacity. For example, for molded containers, quality control techniques have been developed to determine whether the container material is adequately conforming to the walls of the mold. Meeting these requirements depends on whether certain process parameters, such as the temperature of the material and the conditions of the forming operation, are within tolerable limits. It has been found that measuring the volume of the resulting containers not only provides verification of this important parameter, but also provides an excellent way to determine whether the containers are adequately conforming to the mold walls and whether the containers will meet the targeted volumetric content when filled to a predetermined fill line.

Two different volume measurements are of concern when dealing with containers. The first is the ultimate, brimful volume of the containers, normally referred to as the Over-Flow Capacity (OFC). The OFC includes the volume up to the upper rim of the opening. The second measurement is the Fill Line Volume (FLV), which is the volume to a fill line plane to which the container is intended to be filled. Thus, when the properly sized container is filled with liquid such that the surface of the liquid resides in the fill line plane when the container is upright, the volume of liquid equals the FLV. The FLV must meet the packaging target of such containers, and normally becomes a specified amount on the label of most products sold in containers. For monitoring production, once standard production parameters have been established, it is sufficient for quality control purposes to measure and control the OFC of the containers.

The standard method for determining the volume is to fill the container with water and weigh the container with and without the water, using the net water weight and its density to calculate the volume. This method requires filling the container consistently to a particular fill height, as well as making accurate measurements of both weight and temperature, the latter to compensate for changes in the water density. When performed manually, the method is very labor intensive and is subject to operator limitations, making repeatability problematic.

An alternative approach for determining volume is taught in U.S. Pat. No. 5,319,957, which teaches the use of a piston to compress air in the container being tested. The pressure in the container is sensed and the volume determined from the change in pressure. While this approach eliminates the need to fill the container precisely with liquid, it is extremely complicated and requires complex equipment and calculations to obtain the volume measurement. An additional problem is that many containers are sufficiently thin and flexible that the volume may change as the pressure inside the container is increased. Further, this method cannot be used for the determination of the volume to the fill line level.

Thus, there is a need for a simple device and method for measuring the volume of containers which does not require complex equipment or calculations, and which is independent of the exact volume of fluid employed for measuring.

SUMMARY OF THE INVENTION

The present invention provides a device and a method for measuring the volume of containers having a rim. The method is easily executed and the container volume measuring device is simple in structure and provides reliable results. The container volume measuring device has a reservoir of known volume having an upper bounding surface. Preferably, the known volume is comparable to but slightly larger than the volume of the containers to be measured.

A measuring tube is also provided. The measuring tube has a first end and a second end, and has a measuring tube passage which passes therebetween. The measuring tube passage has a passage volume greater than the difference in volume between the known volume of the reservoir and the volume range of the containers to be tested. The measuring tube is positioned such that the first end is sealably attached with respect to the reservoir such that the measuring tube passage communicates with the reservoir. It is preferred that first end of the measuring tube be at the bounding surface of the reservoir, since such will leave the known volume unobstructed. The measuring tube is also attached to a container mount which is configured to sealably engage the rim of the container. The container mount is attached to the measuring tube such that the measuring tube passage communicates with the container at the second end of the measuring tube when the container is attached to the container mount. The measuring tube passage is preferably configured such that the height of liquid in the measuring tube can be correlated to the volume of liquid contained therein. More preferably, the measuring tube passage has a constant cross section such that the height of liquid therein varies linearly with the volume of liquid residing in the measuring tube.

Means are provided for measuring the volume of liquid residing in the measuring tube. When the height of liquid in the measuring tube is correlated to the volume of liquid contained in the measuring tube passage, such means can be provided with various means for measuring the height of the liquid. In one embodiment, the measuring tube is provided with a window of sufficient size to allow the height of the liquid in the measuring tube to be viewed independently of whether the reservoir or the container is beneath the tube. The window in turn has indicia thereon, allowing an operator to visually measure the height of liquid in the measuring tube which is correlatable to the volume of the liquid in the measuring tube. When the tube passage has a constant cross section, the height of the liquid in the measuring tube will be directly proportional to the volume and the indicia can be used to read the volume directly.

The measuring tube is mounted to a support, which allows the measuring tube to be pivoted between two measuring orientations. Preferably, in each of the two measuring orientations the measuring tube is substantially vertical. In the first measuring orientation, the first end of the measuring tube is lower than the second end, while in the second measuring orientation, the first end is elevated above the second end. Preferably, stops are provided on the support to limit the motion of the measuring tube to prevent the measuring tube from being pivoted beyond the two measuring orientations.

When the measuring tube is oriented such that the first end of the measuring tube is lower than the second end, the reservoir and the measuring tube are filled with liquid such that the liquid partially fills the measuring tube. The volume of liquid is selected to be at least as great as the maximum volume of container anticipated. The volume of the liquid in the measuring tube is the excess volume of liquid equal to the difference in volume between the total volume of liquid and the known volume of the reservoir, and is defined as a first excess volume, which is associated with filling the reservoir.

When the container to be measured is attached to the container mount and the measuring tube is pivoted on the support to its second measuring orientation, where the first end of the measuring tube is higher than the second end, the liquid flows into the container. As noted above, the volume of liquid is selected to be at least as great as the volume of largest expected container being measured. Thus, when the measuring tube is pivoted to its second measuring orientation, the liquid again partially fills the measuring tube and establishes a second excess volume of liquid, which is associated with the container being filled. The second excess volume of liquid in the measuring tube equals the difference between the total volume and the volume of the container.

Since the total volume of liquid remains constant, the difference between the first excess volume, which is associated with filling the reservoir, and the second excess volume, which is associated with filling the container, is equal to the difference between the volume of the container and the known volume of the reservoir. Since the volume of the reservoir is known, the volume of the container can then be calculated from the difference in volume of the liquid in the measuring tube. The calculation of the container volume can be done by the operator or, when the volume of liquid in the measuring tube is measured by a sensor or other instrumentation, the calculations can be done by a microprocessor to which the means for measuring the volume of liquid reports its output. Since only the difference in volume is employed in the calculation, the measurement does not depend on the reservoir and the measuring tube being filled with any particular total volume of liquid. This eliminates any need for precision in filling the reservoir and the measuring tube, and makes operation of the device independent of any slight loss of liquid over time due to spillage and/or evaporation.

While the discussion thus far has been general, the container volume measuring device can measure OverFlow Capacity (OFC) without further adaptations. This is the mode of operation when the second end of the measuring tube is mounted in the container mount such that it resides in the plane of the rim of the container when the container is attached to the container mount.

When the container volume measuring device is designed to measure Fill Line Volume (FLV), where the container is to be filled to a fill line plane which is below the rim, the second end of the measuring tube is positioned with respect to the container mount such that the second end resides at the fill line plane of the container when the container is attached to the container mount. As the measuring tube is pivoted on the support to its second measuring orientation, where the first end of the measuring tube is higher than the second end, the liquid flows from the reservoir into the container until the liquid reaches the fill line. As the liquid flows into the container, it displaces the air in the container, which exits the container via the second end of the measuring tube. When the liquid reaches the fill line, it engages the second end of the measuring tube and blocks the further passage of air therethrough. The remaining air is trapped in the container and cannot escape, so further flow of liquid into the container compresses the air until the pressure inside the container and the static pressure of the column of liquid in the measuring tube reach equilibrium, at which time the liquid ceases to flow into the container. Since the height of liquid in the measuring tube is relatively low, the pressure required to maintain such height of liquid is low, and the liquid ceases flowing when the height of liquid in the container is substantially at the fill line plane. In this situation, the difference in excess volume of liquid in the measuring tube allows calculation of the fill line volume of the container.

In this embodiment, where the second end of the measuring tube is positioned at the fill line plane of the container, most of the liquid in the container flows back into the reservoir through the measuring tube passage when the measuring tube is pivoted back to its first measuring orientation. However, a portion of liquid becomes trapped in the upper portion of the container between the fill line plane and the rim of the container. This residual liquid needs to be drained before another measurement is taken. For this reason, when the second end of the measuring tube is positioned at the fill line plane, it is preferred that a drain passage be provided, the drain passage connecting the container mount to the measuring tube passage and being so positioned as to drain the residual liquid. An intermittently operable drain valve is provided to control the flow of liquid through the drain passage. The drain valve is activated to provide passage of liquid through the container mount bypassing the second end of the measuring tube either selectively or, more preferably, automatically when the measuring tube is pivoted back to its first measuring orientation. When the drain valve is closed, passage of fluids through the container mount is restricted to the measuring tube passage.

As noted above, an automatic recording mechanism can be employed for measuring and reporting the excess volumes of the liquid in the measuring tube. In such cases, the output of this instrumentation is preferably provided to a microprocessor programmed to calculate the volume of the container. In one automated system a temperature sensor is provided, and the output from the temperature sensor provided to the microprocessor to allow correcting the calculated volume for the temperature in the event that the reservoir, the measuring tube, and the container are constructed from materials having different thermal expansions. When a microprocessor is employed for calculating the volume of the container, the microprocessor can also be programmed to compare the calculated value to a design volume range to determine whether the calculated volume of the container falls within acceptable limits. When a series of containers are measured, the microprocessor can also be programmed to provide statistical analysis of the container volumes for traditional quality control techniques.

While the volume measuring devices discussed above can be designed to be suitable for determining the volume of containers having a limited variation in size, it is frequently desirable to measure containers having a large distribution of sizes. In such cases, it is preferred for the known volume of the reservoir to be adjustable to accommodate an amount of liquid suitable for measuring different sizes of containers. Flexibility in the capacity of the reservoir can be obtained by means for adjusting the volume of the reservoir. There are a variety of elements which could provide such means, such as a series of reservoirs having various known volumes and a reservoir coupling attaching to the first end of the measuring tube. Alternatively, a reservoir which allows its internal volume to be collapsed or expanded in a known manner could be employed.

It is preferred for the reservoir which is expandable or collapsible to employ two chambers having reciprocally collapsible or expandable volumes and a valve to control flow of liquid between the chambers. One of the chambers, defined as an active chamber, communicates with the measuring tube passage at the first end of the measuring tube and serves to provide a known volume for reference in the manner of the reservoir discussed above. Such reciprocally changeable chambers may be provided by separating the chambers by a piston. As the piston moves to collapse one chamber, its motion correspondingly expands the other chamber.

It is also preferred for the container mount to be adaptable to accept different configurations of container rims by employing a number of container rim adapters. The container mount can employ interchangeable container rim adapters, each of which is attachable to the container mount, or interchangeable container mounts can be employed which are each attachable to the measuring tube, in which case the container rim adapters are each integral with an associated one of the container mounts. Each container rim adapter is designed to mate with a particular configuration of container rim. When multiple, interchangeable container rim adapters are employed, they are preferably designed such that their internal volume, if any, is known to allow for correction of its effect on the perceived container volume so that the difference in height of liquid in the measuring tube continues to correspond to the difference in volume between the container and the reservoir. Alternatively, the container rim adapters can each have a particular known internal volume, which is subtracted when calculating the container volume.

In a preferred embodiment, the measuring tube passage has both a flow passage and a measurement passage. The flow passage extends between the second end of the measuring tube and the reservoir, and has a relatively large cross section to allow the flow of liquid and displaced air therethrough. The measurement passage is smaller in cross section than the flow passage, and extends substantially therealong. The measurement passage communicates with the flow passage such that the height of liquid in both passages is the same. In this embodiment, the means for measuring the excess volume of liquid in the measuring tube is associated with the measurement passage. When the means for measuring the excess volume of liquid is visual or optical in nature, this structure eliminates any requirement for viewing through the flow passage, allowing it to be constructed of a stronger material for improved durability of the resulting device.

In all cases, it is preferred for the measuring tube passage to have a cross section sufficiently small that significant differences in volume result in readily apparent differences in height. However, limiting the cross section of the measuring tube passage can impede the flow of liquid and displaced air between the reservoir and the container when the measuring tube is pivoted between its two orientations.

To promote uninterrupted flow of liquid when the measuring tube is pivoted, thus speeding the measurement process, it is preferred that the device be provided with a means for promoting steady flow of liquid and air past each other through the measuring tube between the reservoir and the container.

In one embodiment, a flow enhancement passage extends between the reservoir and the container mount to allow free flow of air between the container and the reservoir. The flow enhancement passage preferably extends a substantial distance into the reservoir to facilitate flow of air into the reservoir. In the event that the flow enhancement passage extends into the container, its volume as well as for the volume of liquid it will hold must be compensated for when calculating the differential volume. Such compensation is preferably incorporated into the particular means for measuring the volume which is employed. When FLV is to be measured, the flow enhancement passage extends into the container to or somewhat beyond the fill line plane. Preferably, the flow enhancement passage extends only to the fill line plane in this case, to avoid the requirement to compensate for the volume taken up by the portion of the flow enhancement passage extending beyond the fill line plane.

In an alterative embodiment offering enhanced flow, the support is provided with one or more detents to interrupt the pivoting of the measuring tube when the measuring tube is rotated between the two measuring orientations. The detent interrupts pivoting when the measuring tube is in a substantially non-vertical orientation, to aid in the air and the liquid to freely flow past each other. The measuring tube can then be pivoted past the substantially non-vertical orientation to one of its measuring orientations. Preferably two non-vertical positions are provided, each of which is nearly horizontal with one of the reservoir and the container positioned slightly below the other to promote the flow of liquid therebetween.

Other schemes for slowing or temporarily interrupting the rotation of the measuring tube to allow the air time to escape freely will be apparent. For example, a frictional engagement between the measuring tube and the support can be employed, which is overcome by gravity as the liquid shifts between the reservoir and the container. In automated systems, an electro-mechanical drive can be effectively employed to pivot the measuring tube in a desired manner.

In all of the above embodiments, it is preferred for a surfactant to be added to the liquid to reduce the surface tension between the liquid and the interior of the reservoir to promote drainage of liquid therefrom.

To practice the method of the present invention to measure the unknown volume of a container, a measuring tube having one of its ends connected to a reservoir of known volume is provided. Preferably, the measuring tube is configured with a constant cross section to allow the height of the liquid in the measuring tube to be correlated to the volume of liquid residing therein. The reservoir and the measuring tube are oriented such that the reservoir resides below at least a part of the measuring tube. When so positioned, a volume of liquid somewhat greater than the known volume of the reservoir is introduced into the reservoir and the measuring tube, such that the liquid partially fills the measuring tube.

Preferably, the measuring tube is moved to a substantially vertical orientation, if not already so oriented. The volume of liquid in the measuring tube is measured and recorded as a first excess volume of liquid. The first excess volume of the liquid correlates to the total volume of liquid, which consists of the known volume of liquid in the reservoir and the excess volume of liquid which resides in the measuring tube in this orientation ($V_{tube1}$).

$$V_{total} = V_{reservoir} + V_{tube1} \quad \text{(Equation 1)}$$

The container to be measured is mounted to the measuring tube so as to communicate with the end of the measuring tube that is not connected to the reservoir. It should be appreciated that the measurement of the first excess volume could be made after attaching the container to the end of the measuring tube.

The container, the measuring tube, and the reservoir are then substantially inverted to elevate the reservoir substantially above the container. Preferably, the measuring tube is again substantially vertically oriented. The volume of the liquid in the measuring tube is again measured, this value being recorded as a second excess volume. The second excess volume of the liquid again correlates to the total volume of liquid, which consists of the unknown volume of liquid in the container and the excess volume of liquid which resides in the measuring tube in this orientation ($V_{tube2}$).

$$V_{total} = V_{container} + V_{tube2} \quad \text{(Equation 2)}$$

The difference between the first excess volume of liquid and the second excess volume of liquid can be calculated by subtraction. For example:

$$\Delta V = V_{tube1} - V_{tube2} \quad \text{(Equation 3)}$$

Since the total volume remains constant, the difference in excess volume of liquid in the measuring tube is equal to the difference in volume between the container and the reservoir, and the unknown volume of the container can be calculated from the difference in excess volume of liquid and the known volume of the reservoir. One scheme for determining the volume of the container from the volume of the reservoir and the difference in excess volume is shown in the following equations:

$$V_{total} = V_{reservoir} + V_{tube1} = V_{container} + V_{tube2} \quad \text{(Equation 4)}$$

$$V_{container} = V_{reservoir} + V_{tube1} - V_{tube2} \quad \text{(Equation 5)}$$

$$V_{container} = V_{reservoir} + \Delta V \quad \text{(Equation 6)}$$

After the second excess volume has been measured, the volume of the container can be calculated. After this measurement, the container, the measuring tube, and the reservoir can then be reinverted to elevate the container substantially above the reservoir. The container can then be removed while the liquid is retained in the reservoir and the measuring tube. A new container to be measured can then be mounted to the measuring tube and the method repeated to measure the volume of the new container.

BRIEF DESCRIPTION OF THE FIGURES

FIG. 4 is an isometric view of another embodiment of the present invention, which is usable for measuring the fill line volumes of containers. The container mount of this embodiment is mounted to the measuring tube so as to position a second end of the measuring tube at the fill line plane of the container to halt the flow of liquid thereinto when the level of liquid reaches the fill line plane of the container. FIG. 4 shows the device before the container has been mounted thereto.

FIG. 5 illustrates the embodiment shown in FIG. 4 when the container has been attached to the container mount and the measuring tube has been rotated to fill the container with liquid to its fill line plane.

FIG. 6 shows the drain valve when it is closed, with a flange sealing against the wall of the measuring tube.

FIG. 8 is an isometric view of another embodiment of the present invention that is suitable for measuring the fill line volumes of containers. This embodiment employs a measuring tube with a non-uniform cross section. FIG. 8 shows the device before the container has been mounted thereto.

FIG. 9 illustrates the embodiment shown in FIG. 4 when the measuring tube has been rotated to fill the container with liquid to its fill line plane.

FIG. 18 shows the measuring tube in a substantially vertical measuring orientation.

BEST MODE OF CARRYING THE INVENTION INTO PRACTICE

Figures 1, 2:
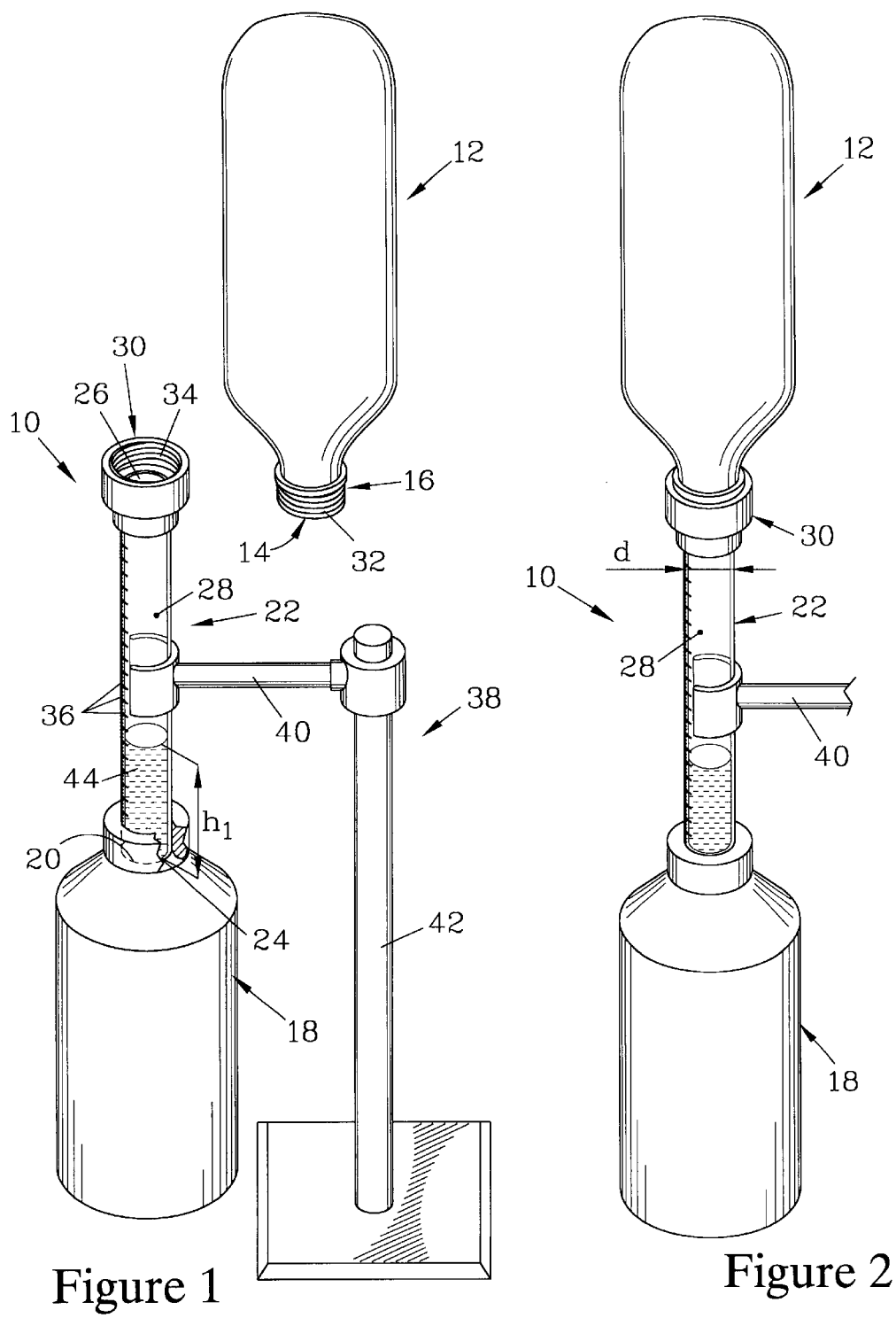
FIG. 1 is an isometric view of a volume measuring device, which forms one embodiment of the present invention. The volume measuring device has a measuring tube connected at one end to a reservoir. As illustrated, liquid fills the reservoir and partially fills the measuring tube. Indicia on the measuring tube allow an operator to visually measure the height of the liquid in the measuring tube, which in this embodiment has a constant cross-section. The measuring tube is mounted to a support, which allows pivoting the measuring tube in a vertical plane. A container mount is attached to the other end of the measuring tube, and is configured such that a container can be readily attached thereto.
FIG. 2 is an isometric view of the device of FIG. 1 where the container has been attached to the container mount.
Figure 3:
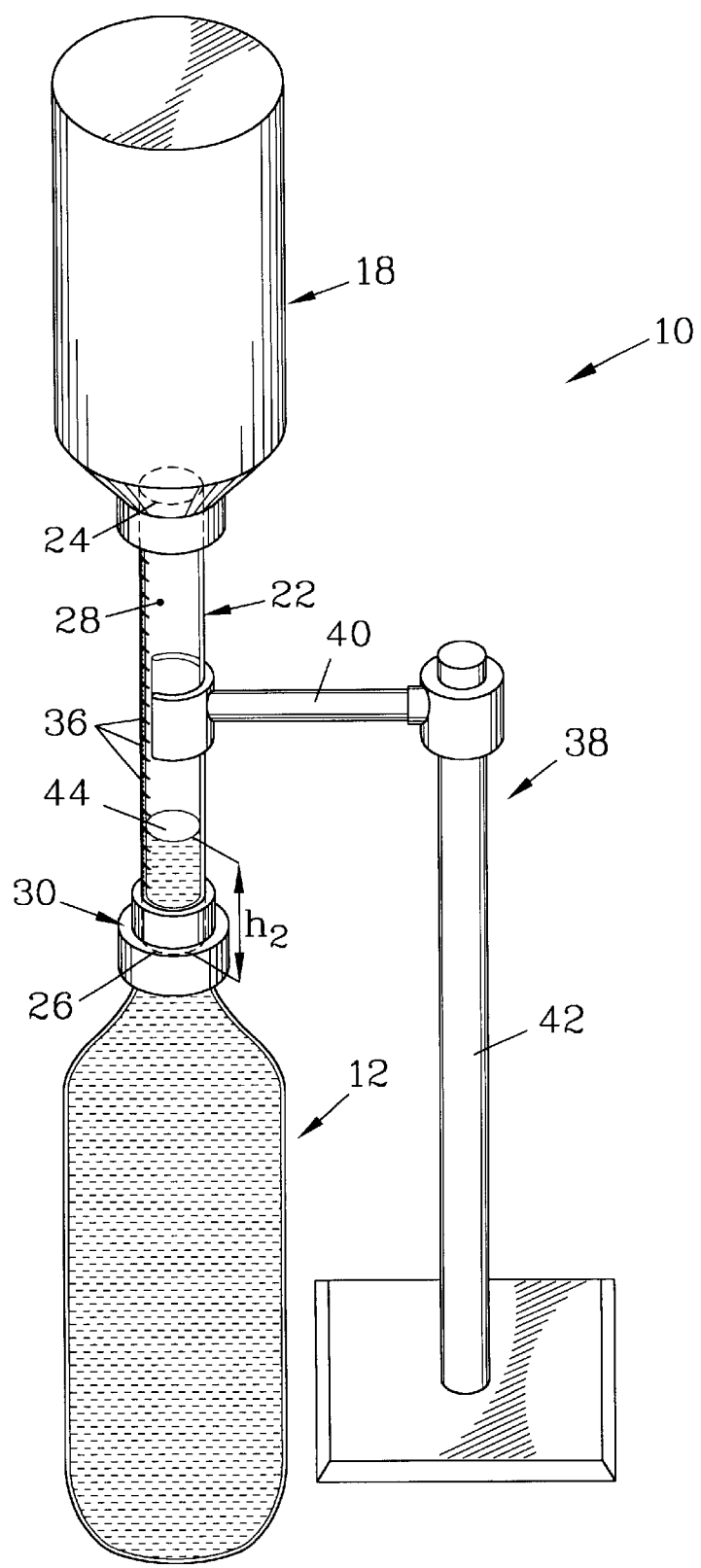
FIG. 3 is an isometric view of the device shown in FIGS. 1 and 2 with the container attached and the measuring tube pivoted to an inverted position, where the liquid flows from the reservoir into the container. The difference between the new height of liquid in the measuring tube and the previous height is proportional to the difference in volume between the container and the reservoir.

FIGS. 1–3 illustrate one embodiment of the present invention, a container volume measuring device 10 which is suitable for measuring the volume of containers 12 (only one of which is shown) having a particular standard configuration, including a container rim 14 (shown in FIG. 1). The rim 14 is the bounding surface of the opening of the container 12 and is the terminal end of a securing surface 16 designed to allow the attachment of a cap or lid to close the container 12.

The container volume measuring device 10 has a reservoir 18 having an upper bounding surface 20 which defines a known volume, which is preferably similar to the expected volume of the containers 12.

A measuring tube 22 is also provided, which terminates at a first end 24 and a second end 26 and has a measuring tube passage 28 extending therethrough. In this embodiment, the measuring tube 22 is cylindrical, with the measuring tube passage 28 having a constant cross-section. The first end 24 is sealably attached to the upper bounding surface 20 of the reservoir 18 such that the measuring tube passage 28 communicates with the reservoir 18.

The second end 26 of the measuring tube 22 is attached to a container mount 30 which is designed to grip the securing surface 16 and sealably engage the container rim 14 when the container 12 is attached to the container mount 30. When the container 12 is so attached to the container mount 30 (as shown in FIG. 2), the measuring tube passage 28 communicates with the container 12 through the second end 26 of the measuring tube 22. In this embodiment, the second end 26 resides in a plane which bounds the rim 14 when the container 12 is attached to the container mount 30, making the container volume measuring device 10 suitable for measuring OverFlow Capacity (OFC) of the containers 12. The container 12 illustrated employs male screw threads 32 on the securing surface 16, and the container mount 30 employs matching female screw threads 34. In this embodiment, the male screw threads 32 of the securing surface 16 are engaged with the female screw threads 34 of the container mount 30, and thereafter the container 12 is rotated to secure the container rim 14 in the container mount 30.

The tube passage 28 of the measuring tube 22 in this embodiment is cylindrical, having a constant passage diameter d (shown in FIG. 2). Since the cross-section is constant, the volume of liquid residing in the measuring tube is directly proportional to the height of the liquid. The measuring tube 22 is constructed of a transparent material so that the height of liquid contained therein can be viewed by the operator. The measuring tube 22 is marked with indicia 36 which correspond to units of volume. Thus, the indicia 36 provide a visual means for measuring the volume of liquid residing in the measuring tube passage 28.

The measuring tube passage 28 is sized to have a passage volume greater than the expected difference in volume between the known volume of the reservoir 18 and the volumes of the containers 12. To provide reasonable flexibility in the mis-match between the expected range of volumes of the containers 12 and the volume of the reservoir 18, it is convenient to have the measuring tube passage 28 sized to accommodate about 40–50 ml of liquid. To provide an easily readable scale for measuring such volumes in the measuring tube 22, it is preferred that the length of tube associated with 1 ml of fluid be about 5–6 mm. For these constraints, the tube passage 28 of the measuring tube 22 should have a passage diameter d of about 20–25 mm. For the embodiment of FIGS. 1–3 the height of liquid in the measuring tube 22 is related in a linear manner to the volume contained in the tube passage 28, since the passage diameter d of the tube passage 28 is constant. For example, when the passage diameter d measures 20 mm, each mm of height of the liquid is exactly 0.31 ml.

The measuring tube 22 is pivotably mounted to a support 38. The support 38 has a tube-supporting arm 40, which fixably engages the measuring tube 22. The tube-supporting arm 40 in turn is pivotably mounted to a base portion 42, which remains fixed. The base portion 42 of the support 38 is configured to stand on a horizontal surface such as a workbench. The pivotable mounting of the tube-supporting arm 40 to the base portion 42 allows the measuring tube 22 to be pivoted between a first measuring orientation where the measuring tube 22 is substantially vertical, shown in FIGS. 1 and 2, and a second measuring orientation where the measuring tube 22 is substantially vertical, shown in FIG. 3. In this embodiment, friction maintains the measuring tube 22 in whichever of these two orientations the operator places it.

When the measuring tube 22 is in its first measuring orientation, the reservoir 18 is positioned below the measuring tube 22, as shown in FIGS. 1 and 2. In this orientation, a liquid 44 can be introduced into the container volume measuring device 10 in sufficient quantity to fill the reservoir 18 and partially fill the measuring tube 22. The volume of the liquid 44 contained in the measuring tube 22 (the volume associated with a first liquid height $h_1$ as measured from the first end 24 of the measuring tube 22) is equal to the difference between the total volume of the liquid 44 and the known volume of the reservoir 18, and is defined as a first excess volume. The first excess volume is associated with the liquid 44 filling the reservoir 18.

Once the container 12 has been mounted to the container mount 30 (as shown in FIG. 2), the measuring tube 22 can be pivoted to its second measuring orientation, shown in FIG. 3. In the second measuring orientation, the first end 24 of the measuring tube 22 is higher than the second end 26, and gravity causes the liquid 44 to flow from the reservoir 18 through the measuring tube passage 28 into the container 12. The total volume of the liquid 44 is selected not only so as to be somewhat greater than the volume of the reservoir 18, but also to be somewhat greater than the expected volume of the container 12, so the liquid 44 again partially fills the measuring tube passage 28. The liquid 44 fills the measuring tube passage 28 to a second liquid height $h_2$ (as measured from the second end 26 of the measuring tube 22). In this embodiment, the container mount 30 is positioned with respect to the measuring tube 22 such that the container rim 14 is co-planar with the second end 26 of the measuring tube 22 when the container 12 is attached to the container mount 30, so the second liquid height $h_2$ is directly related to the volume of the liquid 44 in the measuring tube 22. The second liquid height $h_2$ corresponds to a second excess volume of the liquid 44, which is equal to the difference between the total volume of the liquid 44 and the actual volume of the container 12.

With the above described volume measuring device 10, the volume of the container 12 can be readily determined, since the total volume of the liquid 44 does not change when the measuring tube 22 is pivoted. The difference in height $\Delta h$ between the first liquid height $h_1$ and the second liquid height $h_2$ of the liquid 44 in the measuring tube 22 when the measuring tube 22 is pivoted from its first measuring orientation to its second measuring orientation is directly proportional to the difference in volume between the known volume of the reservoir 18 and the unknown volume of the container 12. Furthermore, since the measuring tube passage 28 has a constant passage diameter d, the difference in volume in the measuring tube passage 28 can be readily obtained by multiplying the difference in height $\Delta h$ of the liquid by the cross-sectional area of the measuring tube passage 28, which is proportional to the square of the diameter.

$$\Delta h = h_1 - h_2 \qquad \text{(Equation 7)}$$

$$\Delta V = \Delta h \times \pi (d/2)^2 \qquad \text{(Equation 8)}$$

Thus, using Equation 6 presented above, the volume of the container 12 can readily be determined from the known volume of the reservoir 18 and the differential volume of the liquid 44 in the measuring tube 22. Furthermore, since the total volume of the liquid 44 need not be determined, any losses due to spillage, wall wetting of the sample container, or evaporation do not affect the measurement.

Once the measurement of the differential volume of the liquid 44 in the measuring tube 22 has been determined, the measuring tube 22 is returned to its first measuring orientation and the liquid 44 flows back into the reservoir 18. The container 12 may then be unscrewed from the container mount 30, and a new container 12 may be mounted for measuring.

In the container volume measuring device 10 discussed above, the container volume measured has been the Over-Flow Capacity (OFC). While measurement of the OFC is practical for quality control purposes, it is frequently desirable to measure the fill line volume (FLV) of containers. FIGS. 4 and 5 illustrate a container volume measuring device 100, which is designed to measure the fill line volume (FLV) of containers 102 (only one of which is shown), having a rim 104 and a defined fill line plane 106 which is spaced apart from the rim 104. The volume measuring device 100 shares many features in common with the container volume measuring device 10 shown in FIGS. 1–3. The container volume measuring device 100 has a reservoir 108 having a known volume, and a measuring tube 110. The measuring tube 110 again has a constant cross sectional area; however, in this embodiment the cross section of the measuring tube 110 is square rather than circular. The container volume measuring device 100 also has a container mount 112 which sealably engages the rim 104 of the container 102. The container volume measuring device 100 differs from the container volume measuring device 10 primarily in the details of the positioning of the mounting of the measuring tube 110 with respect to rim 104 of the container 102.

The measuring tube 110 has a first end 116, which communicates with the reservoir 108, and a second end 118, which communicates with the container 102. A measuring tube passage 119 extends between the first end 116 and the second end 118 of the measuring tube 110. In this embodiment, the measuring tube 110 is positioned such that it passes through the container mount 112 with the second end 118 of the measuring tube 110 being so positioned with respect to the container mount 112 that the second end 118 extends into the container 102 when the container 102 is mounted to the container mount 112. When the container 102 is so mounted, the second end 118 of the measuring tube 110 resides at the fill line plane 106 of the container 102, as shown in FIG. 5. Thus, providing a particular extension of the second end 118 into the container 102 defines the fill line plane 106 to be measured.

Prior to mounting the container 102 to the container mount 112, a liquid 120 is introduced to the reservoir 108 through the measuring tube 110 in sufficient quantity to fill the reservoir 108 and partially fill the measuring tube 110 as is illustrated in FIG. 4. Again, in this embodiment the first liquid height $h_1$ of the liquid 120 in the measuring tube 110 can be measured and it will again be directly proportional to the first excess volume of the liquid 120 in the measuring tube 110 which is the "$V_{tube1}$" of Equation 4 presented above.

The measuring tube 110 is held by a support 122 having a support arm 124 and a base portion 126. The measuring tube 110 is pivotally mounted with respect to the base portion 126 and, when pivoted on the support 122 to its second measuring orientation, illustrated in FIG. 5, the liquid 120 flows from the reservoir 108 into the container 102. As the liquid 120 flows into the container 102, it displaces the air in the container 102, which enters the second end 118 of the measuring tube 110 and passes through the measuring tube passage 119, exiting through the first end 116 into the reservoir 108. However, once the liquid 120 reaches the fill line plane 106, as shown in FIG. 5, it engages the second end 118 of the measuring tube 110 and blocks the entry of air into the measuring tube passage 119. The remaining air trapped in the container 102 provides sufficient pressure to prevent further flow of liquid into the container 102, thereby halting the flow of liquid 120 into the container 102 when the height of liquid in the container 102 reaches the fill line plane 106. Thus, the fill line volume (FLV) rather than the OFC of the container 102 can be measured. Here, the quantity of the liquid 120 residing in the measuring tube passage 119 corresponds to the second excess volume of the liquid 120 in the measuring tube 110, indicated by the term "$V_{tube2}$" of Equation 4. Since the cross section of the measuring tube passage 119 is constant, this second excess volume is directly proportional to the second liquid height $h_2$ which is measured from the second end 118 of the measuring tube 110. With these volumes and the known volume of the reservoir 108, the fill line volume of the container 102 can be determined.

Figure 6:
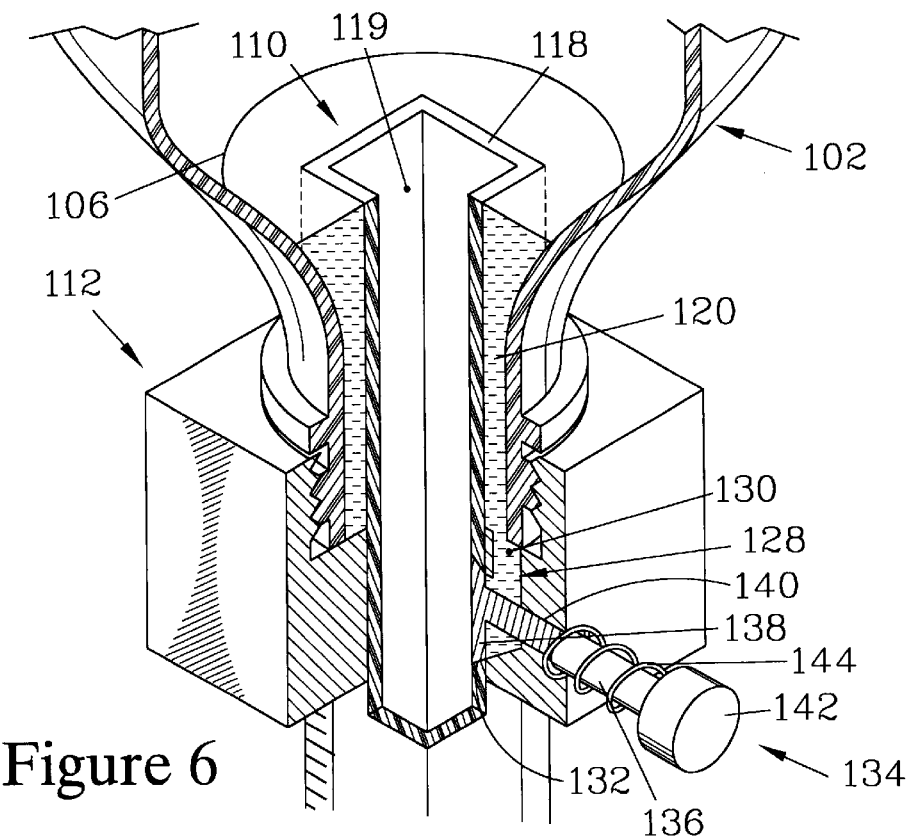
FIG. 6 is a detail view showing a drain passage and a drain valve employed in the embodiment shown in FIGS. 4 and 5 to drain liquid trapped around the measuring tube after the volume of the container has been measured and the measuring tube has been returned to its first substantially vertical orientation.
Figure 7:
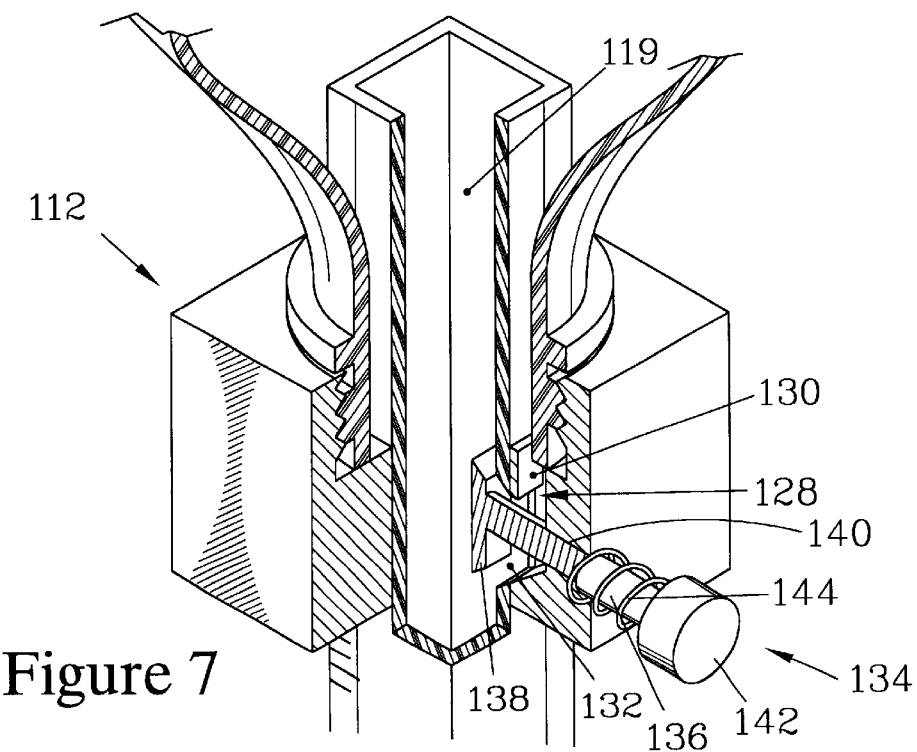
FIG. 7 is a detail view of the drain valve shown in FIG. 6 when a stem of the valve has been depressed to disengage the flange from the measuring tube to drain the entrapped liquid.

After the measurement of the second liquid height $h_2$ has been taken, the measuring tube 110 is returned to its first measuring orientation (shown in FIG. 4), a partial section view of which is shown in FIGS. 6 and 7. When the measuring tube 110 is returned to its initial position, some of the liquid 120 is trapped in the container 102, since it now resides below the second end 118 of the measuring tube 110, as is illustrated in FIG. 6. To provide for the return of this liquid to the reservoir 108, a drain passage 128 is provided, which has a cap drain port 130 and a tube drain port 132. The drain passage 128 allows the retained liquid 120 to flow from the container 102 to the reservoir 108.

A valve assembly 134 is provided to close the tube drain port 132 so as to maintain the air pressure in the container 102 necessary to limit the liquid 120 entering the container 102 to the height of the second end 118 of the measuring tube 110 when the measuring tube 110 is in its second orientation, as discussed above. The valve assembly 134 has a stem 136 terminating in a flange 138 configured such that, when seated, the flange 138 is flush with the wall of the measuring tube 110, as is illustrated in FIG. 6, thereby sealably engaging the tube drain port 132. The stem 136 passes through a stem passage 140 in the container mount 112 and terminates in a head 142. A compression spring 144 maintains the flange 138 sealably engaged against the measuring tube 110 until such time as the head 142 is depressed. When the head 142 is depressed, as is illustrated in FIG. 7, the flange 138 moves into the measuring tube passage 119, opening the tube drain port 132 and allowing the entrapped liquid 120 to drain into the reservoir 108. The valve assembly 134 as illustrated is designed to be manually operated. While a manually operated device is illustrated, an automated action can be provided by employing a valve which opens automatically when the measuring tube 110 is pivoted to its first measuring orientation, and is automatically closed when the measuring tube 110 is pivoted away from its first measuring orientation.

FIGS. 8 through 11 illustrate a container volume measuring device 200 which is again designed to measure fill line volume (FLV) and is similar in many respects to the container measuring device 100 illustrated in FIGS. 4 through 7. This embodiment differs principally in details of its measuring tube 202, which is not of uniform cross section, and in the details of the drain passage 204 and valve assembly 206 for opening and closing the same (best shown in FIG. 10). The use of a measuring tube 202 having a non-uniform cross section does not substantially change the operation of the volume measuring device 200. However, since the volume of liquid residing in the measuring tube 202 is to be obtained by visual observation, indicia 208 are provided which, for this embodiment, are not uniformly spaced. This non-uniform spacing makes it less convenient to read the volume accurately so as to correlate the height of liquid in the measuring tube 202 to the volume contained therein.

Figure 10:
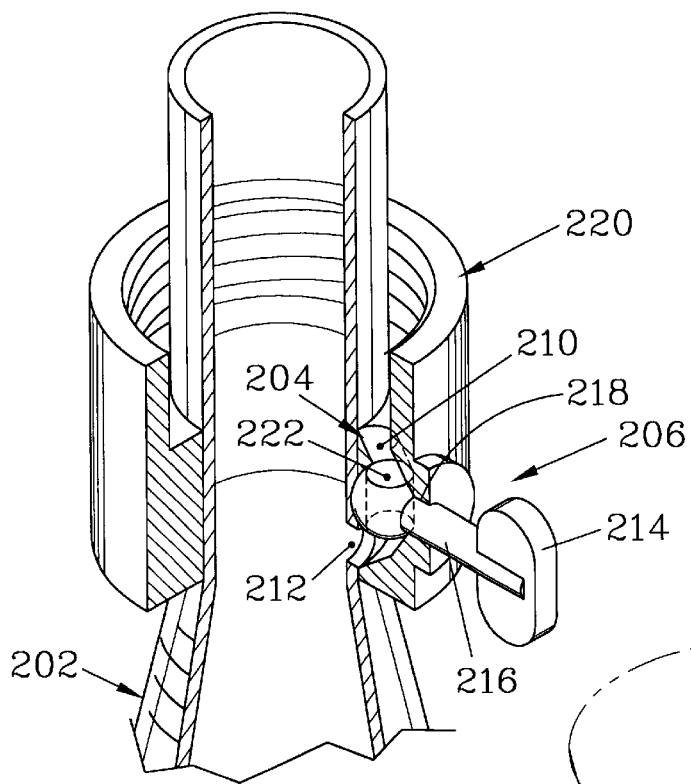
FIG. 10 is a detail view showing a drain valve employed in the embodiment shown in FIGS. 8 and 9, which employs a stopcock.
Figure 11:
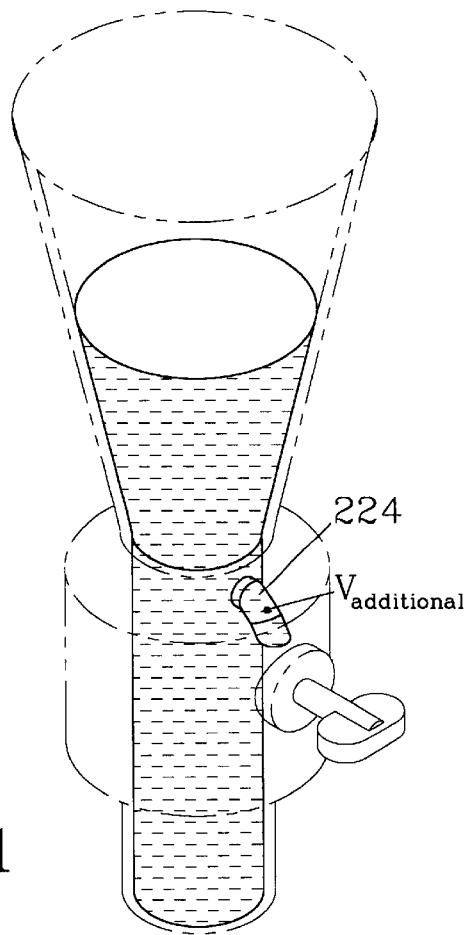
FIG. 11 is a view of the volume occupied by the liquid contained in the embodiment shown in FIGS. 8–10 when the measuring tube is in the orientation shown in FIG. 9. The drain valve of this embodiment allows a small volume of liquid to reside in a drain passage.

Referring to FIG. 10, the drain passage 204 has many features in common with the drain passage 128 of the volume measuring device 100. The drain passage 204 has a cap drain port 210 and a tube drain port 212. However, the drain passage 204 differs in that there is no seal provided at the tube drain port 212. This occurs since the valve assembly 206 employs a stopcock having a knob 214 attached to a stem 216 which engages a stem passage 218 in a container mount 220. The stem passage 218 is positioned to intersect the drain passage 204. The stem 216 is configured to rotatably and sealably engage the stem passage 218. The stem 216 has a stem conduit 222 which can be rotated into and out of alignment with the drain passage 204. It should also be noted that, since some of the drain passage 204 is available for holding liquid even when the stopcock is in the closed position, this additional volume $V_{additional}$ 224 must be included in the measurement when the measuring tube 202 is in its second orientation. This additional volume of liquid $V_{additional}$ 224 is illustrated in FIG. 11. Compensation for the additional volume of liquid $V_{additional}$ 224 can be readily incorporated into the positioning of the indicia 208 to avoid the need to make such compensation with each measurement calculation.

Figure 12:
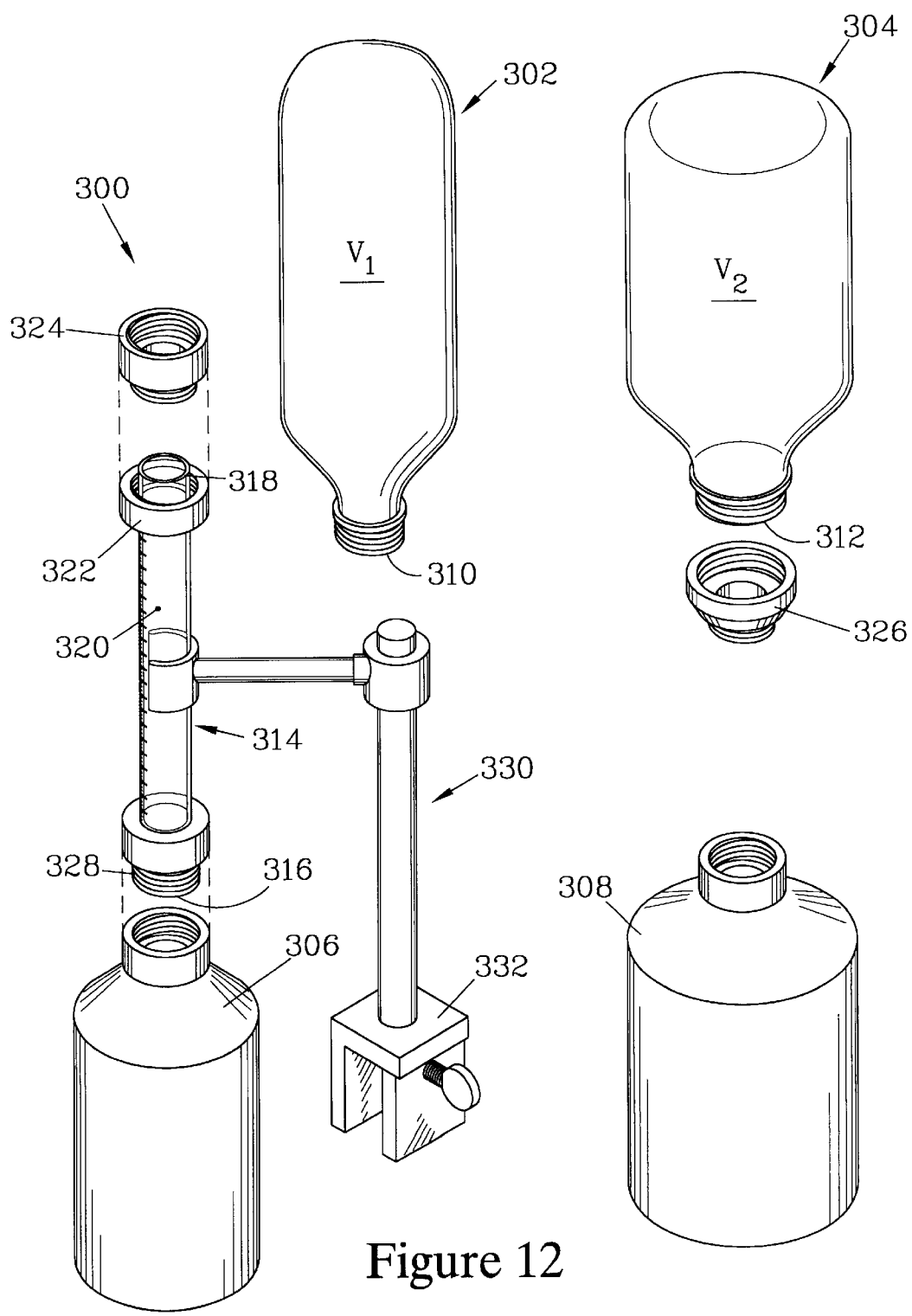
FIG. 12 is an isometric view of another embodiment of the present invention, which is usable for measuring various container configurations. The reservoir of this embodiment is removably mounted to the measuring tube, and can be replaced with a second reservoir having a different volume. Similarly, the container mount of this embodiment has a container rim adapter which is removably mounted to the measuring tube and can be replaced with a second container rim adapter configured to attach to a different container configuration.

FIG. 12 illustrates a container volume measuring device 300 which shares many of the features of the earlier embodiments described above, but which differs in its ability to measure the volumes of a variety of containers having different configurations, different volumes, or both. This embodiment also differs in the details of the measuring tube and the support structure.

Treating first the structural differences that allow the container volume measuring device 300 to measure different container configurations, the container volume measuring device 300 is illustrated with two distinct container types. The first series of containers (only one of which is shown as 302) differs from a second series of containers (only one of which is shown as 304) in two respects. The first container 302 has a first container volume $V_1$ while the second container 304 has a second container volume $V_2$, and these volumes differ. If the difference in volume is significant, then to have a reservoir which is appropriately sized with respect to the expected container volume ($V_1$ or $V_2$) as discussed earlier requires the use of multiple reservoirs, with a first reservoir 306 being employed when the series of first containers 302 is being measured, and a second reservoir 308 being employed when the second series of containers 304 is being measured. The first container 302 also has a first container rim 310, while the second container 304 has a second container rim 312 that is distinct from the first container rim 310.

When multiple container rims are to be accommodated by the container volume measuring device 300, a measuring tube 314 is employed that is modified so as to be suitable for the accommodation of the multiple types of containers (302, 304) and the multiple size reservoirs (306, 308). The measuring tube 314 again has a first end 316 and a second end 318 with a measuring tube passage 320 extending therebetween.

In this embodiment, a container mount 322 is fitted with a suitable first container rim adaptor 324 and the combination of the first container rim adapter 324 and the container mount 322 are sealably attached to the measuring tube 314 such that the second end 318 of the measuring tube 314 is appropriately positioned with respect to first container rim 310 for measurement of either the OFC or the FLV. As illustrated, the volume measuring device 300 is configured to measure OFC. For measuring one of the first containers 302, the first container rim adaptor 324 is sealably engaged with respect to the second end 318 of the measuring tube 314 as well as with the first container rim 310. The container mount 322 and the first container rim adaptor 324 sealably engage the measuring tube 314 while allowing the measuring tube passage 320 to communicate with the first container volume $V_1$.

Similarly, a second container rim adaptor 326 is provided which can be fitted to the container mount 322 in place of the first container rim adaptor 324 when measuring one of the second containers 304. The second container rim adaptor 326 is designed to mate with the second rim 312 of the second container 304, and again the second container rim adapter 326 and the container mount 322 are sealably attached to the measuring tube 314 such that the second end 318 of the measuring tube 314 is appropriately positioned with respect to the second container rim 312 for measurement of either the OFC or the FLV, and are configured to allow the measuring tube passage 320 to communicate with the second container volume $V_2$.

To facilitate measuring containers of substantially different volumes, the first end 316 of the measuring tube 314 is fitted with a reservoir coupling 328 that allows the reservoirs 306 and 308 to be interchanged. The volume measuring device 300 also has a support 330 that differs from the support 122 discussed above in that the support 330 terminates in a clamp 332 for affixing to a structure such as a workbench back (not shown).

Figure 13:
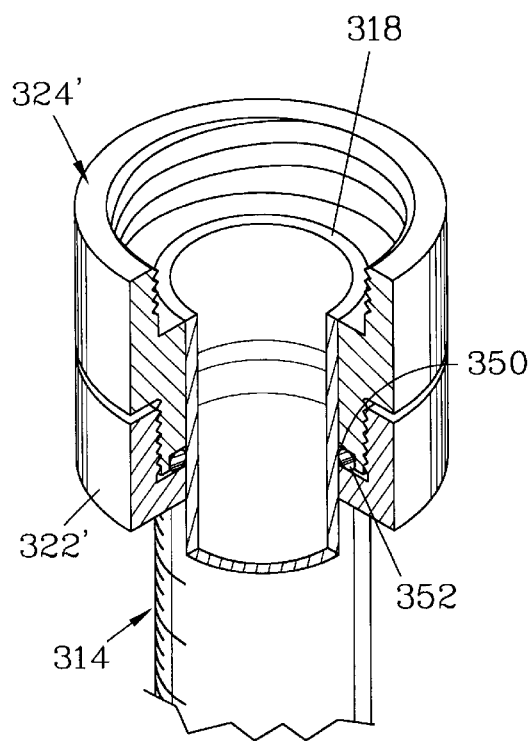
FIG. 13 is a detail view showing a preferred container mount and container rim adapter. The container mount slidably engages the measuring tube, and is secured in position thereon by a compression seal when the container rim adapter is mounted onto the container mount.

FIG. 13 is a partially cut away view that illustrates one preferred container mount 322' and container rim adapter 324' which can be employed in the container volume measuring device 300. The container mount 322' slidably engages the measuring tube 314 and is fixably attachable to the measuring tube 314. The container rim adapter 324' is threadably engaged with the container mount 322', and has a channel 350 at the bottom which is fitted with a compression seal 352. As the container rim adapter 324' is tightened onto the container mount 322', the compression seal 352 is deformed so as to forcibly engage the measuring tube 314, and thereby serve to affix the container mount 322' with respect to the measuring tube 314. The particular embodiment in FIG. 13 has particular appeal since this design allows the second end 318 of the measuring tube 314 to be positioned for measuring either OFC or FLV, adding to the flexibility of the volume measuring device 300.

Figure 14:
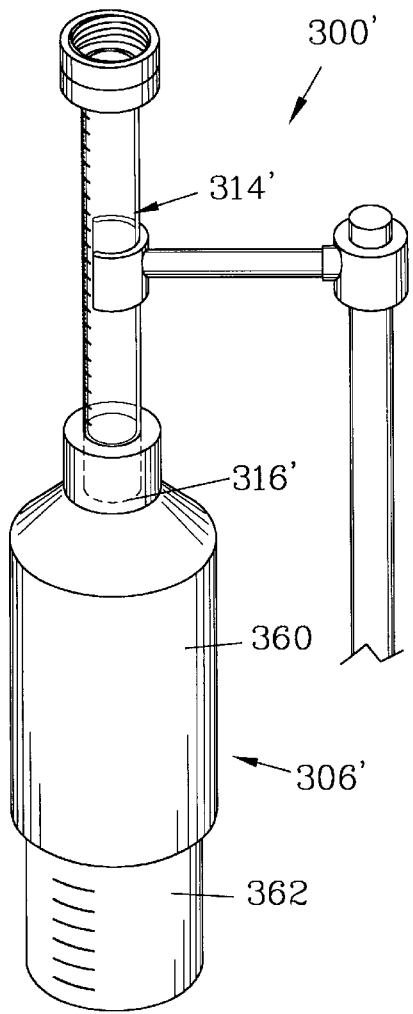
FIG. 14 is an isometric view of another embodiment that is usable for measuring various container configurations. The reservoir of this embodiment is adjustable to vary its internal volume by adjustment of two sections which make up the reservoir.

FIG. 14 illustrates an alternative volume measuring device 300' which is similar to the volume measuring device 300 except for the employment of a reservoir 306' in place of the interchangeable reservoirs (306, 308) employed in the volume measuring device 300. The volume measuring device 300' is again designed to measure the volumes of a series of the first containers 302 and a series of the second containers 304 which have substantially different volumes ($V_1$ and $V_2$). The reservoir 306' is permanently attached to the first end 316' of the measuring tube 314'. The reservoir 306' has a first section 360, which is attached to the first end 316' of the measuring tube 314', and a second section 362, which adjustably engages the first section 360. The adjustment of the position of the second section 362 relative to the first section 360 changes the internal volume of the reservoir 306'. This allows the volume of the reservoir 306' to be adjusted to appropriately match either the first volume $V_1$ of the first container 302, or the second volume $V_2$ of the second container 304.

Figures 15, 16:
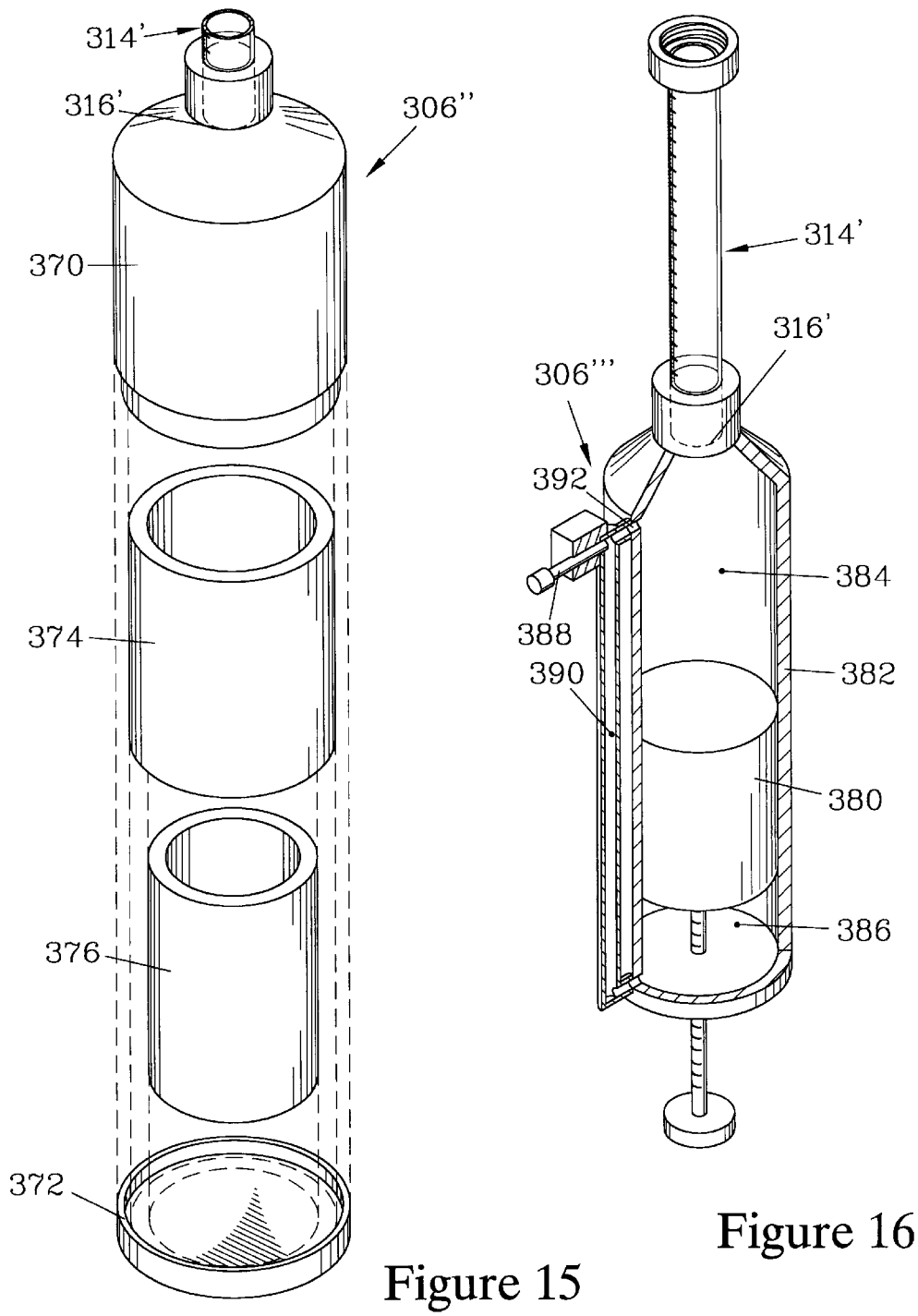
FIG. 15 is an exploded view of a reservoir similar to those shown in FIG. 12, but which can be disassembled to allow part of the internal volume of the reservoir to be selectively displaced by installing one or more reservoir inserts.
FIG. 16 is an isometric view of another embodiment, where the volume of the reservoir can be adjusted by use of a piston which moves to reciprocally change the volumes of an active chamber, which serves as the known volume of the reservoir, and a passive chamber. This embodiment allows changing the reservoir volume without a need to empty or refill the reservoir with liquid.

FIG. 15 illustrates an alternative reservoir 306" which employs an alternative scheme for adjusting its internal volume. The reservoir 306" is again permanently attached to the first end 316' of the measuring tube 314'. The reservoir 306" has a fixed portion 370, which is attached to the first end 316' of the measuring tube 314', and a removable portion 372 which can be removed to allow access to the interior of the reservoir 306". To adjust the internal volume of the reservoir 306" to match the volume of various container sizes, a first reservoir insert 374 and a second reservoir insert 376 are provided. The reservoir inserts (374, 376) can be selectively inserted into the reservoir 306". Each of the reservoir inserts (374, 376) displaces a particular volume, which is thus subtracted from the effective internal volume of the reservoir 306" when the reservoir inserts (374, 376) are placed therein. While the reservoir inserts (374, 376) shown are formed as hollow cylinders to closely match the interior of the reservoir 306", it should be appreciated that other shapes could be employed, and various numbers of inserts could be used to provide greater variety in adjustment of the volume. However, the shape of any reservoir inserts should be designed to avoid trapping liquid and to prevent the insert from entering the measuring tube 314' when the measuring tube 314' is pivoted to its second measuring orientation.

FIG. 16 illustrates yet another embodiment of an adjustable reservoir 306''', which employs a movable piston 380 slidably mounted in a reservoir cylinder 382. The piston 380 divides the reservoir 306''' into an active chamber 384 and a passive chamber 386. The active chamber 384 communicates with the first end 316' of the measuring tube 314' to function in the same manner as the reservoirs (306, 308, 306', and 306") discussed above. The piston 380 can be moved by a desired amount to change the volume of the active chamber 384. When the piston 380 is moved, a reservoir valve 388 is opened to allow liquid contained in the reservoir 306''' to flow through a reservoir passage 390 between the active chamber 384 and the passive chamber 386. The reservoir valve 388 is preferably positioned to close the reservoir passage 390 at an active chamber inlet 392 to prevent any residual liquid remaining in the reservoir passage 290 when the measuring tube 314' is moved to its second measuring position.

Figure 17:
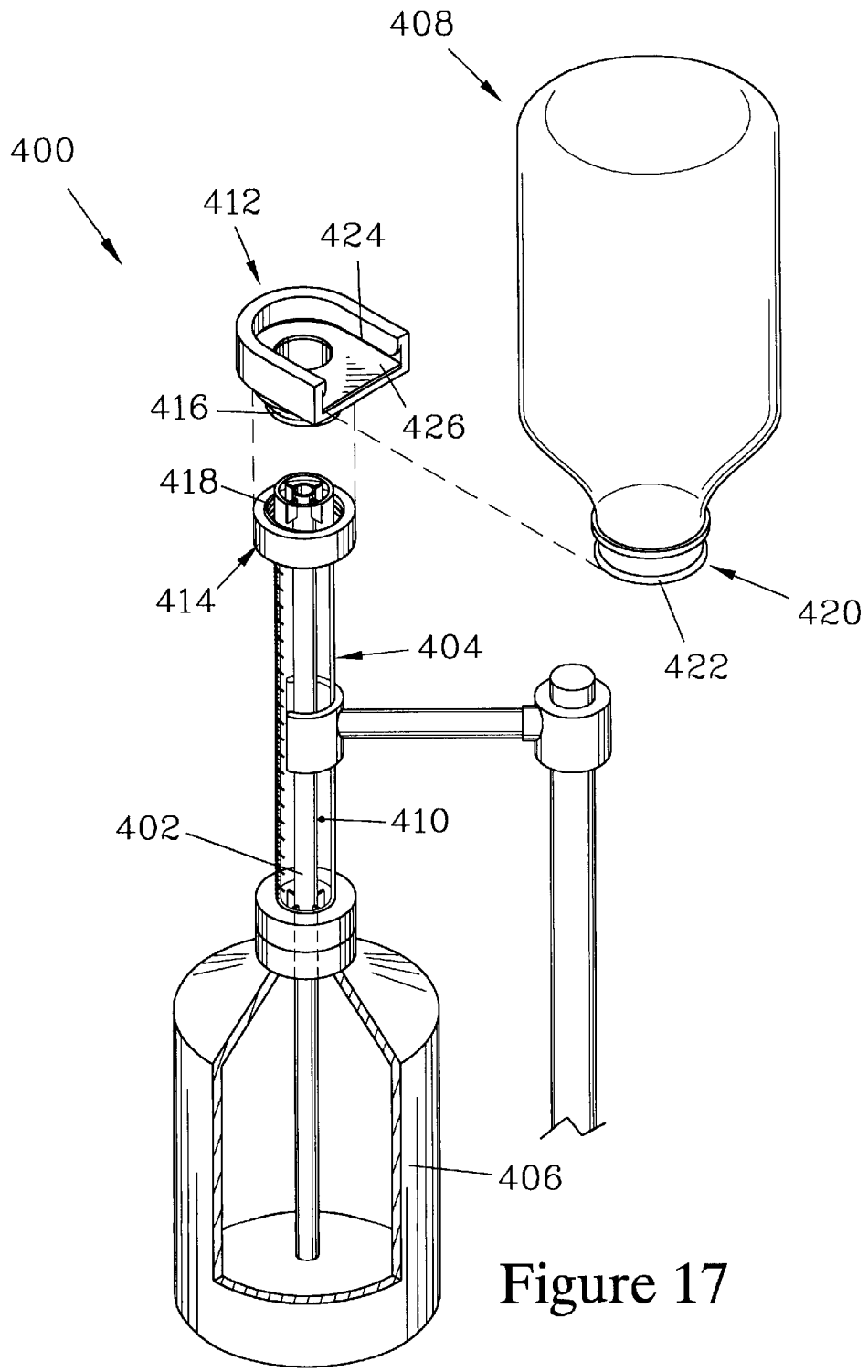
FIG. 17 is an isometric view of another embodiment of the present invention, which employs a flow enhancement passage extending inside the measuring tube to promote the flow of liquid when the measuring tube is pivoted. This embodiment also has a container rim adapter which is configured to be slidably engaged by a container rim.

FIG. 17 illustrates another embodiment of a volume measuring device 400 which is very similar to the volume measuring device 300 shown in FIG. 12, but which differs from the embodiments discussed earlier in that it has a flow enhancement passage 402 extending through a measuring tube 404 to promote the steady flow of liquid and air past each other between a reservoir 406 and a container 408. The flow enhancement tube 402 passes through a measuring tube passage 410 of the measuring tube 404. When the measuring tube 404 is pivoted, the flow enhancement tube 402 provides a passage for displaced air to allow the free flow of liquid through the measuring tube passage 410. The flow enhancement tube 402 preferably extends beyond the measuring tube 404 and into the reservoir 406 to promote flow of air past liquid contained in the reservoir 406 when the measuring tube 404 is positioned such that the reservoir 406 resides above the measuring tube 404 (defined as the second measuring orientation for earlier embodiments). However, it is preferred for the flow enhancement tube 402 to extend only into the reservoir 406 and not into the container 408, to avoid a need to compensate for any volume of the container 408 taken up by the flow enhancement tube 402 as well as the liquid which is maintained therein when the measuring tube 404 is in its second measuring orientation and the liquid has been drained from the reservoir 406. When the flow enhancement tube 402 is provided, compensation must be made for the volume of liquid displaced by the extension of the flow enhancement tube 402 into the reservoir 406 and for the volume occupied in the measuring tube passage 410.

FIG. 17 also illustrates a container rim adapter 412 which allows mounting the container 408 to a container mount 414. The container rim adapter 412 has adapter male screw threads 416 which match mount female screw threads 418 provided on the container mount 414 to allow the container rim adapter 412 to be readily attached thereto. The container rim adapter 412 is configured to sealably engage a container rim 420 of the container 408 that has a lip 422, rather than screw threads. The container rim adapter 412 has a lip-engaging recess 424 configured to snuggly engage the lip 422. To provide a watertight seal, the container rim adapter 412 has a compression pad 426 of a resilient material. When the lip 422 is inserted into the lip-engaging recess 424, the container rim 420 is forcibly engaged with the compression pad 426 so as to form a watertight seal therewith. It should be noted the other means to seal the container rim 420 to the container rim adaptor 412 could be employed, such as an adjustable bottle harness which, when cinched, would proved a seal between the rim 420 and the pad 426.

Figure 18:
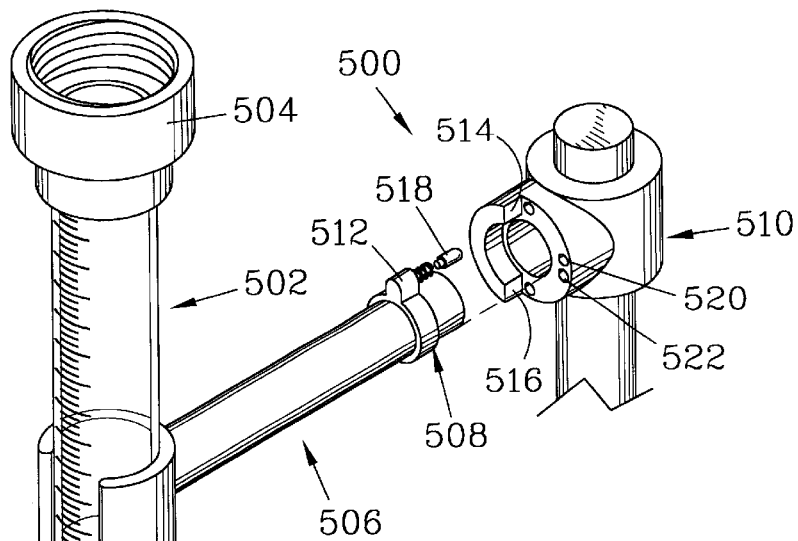
FIG. 18 is a partial exploded view of a support, which has detents for halting pivoting of the measuring tube when the measuring tube is in one of two substantially horizontal orientations where liquid can readily flow through the measuring tube.
Figure 19:
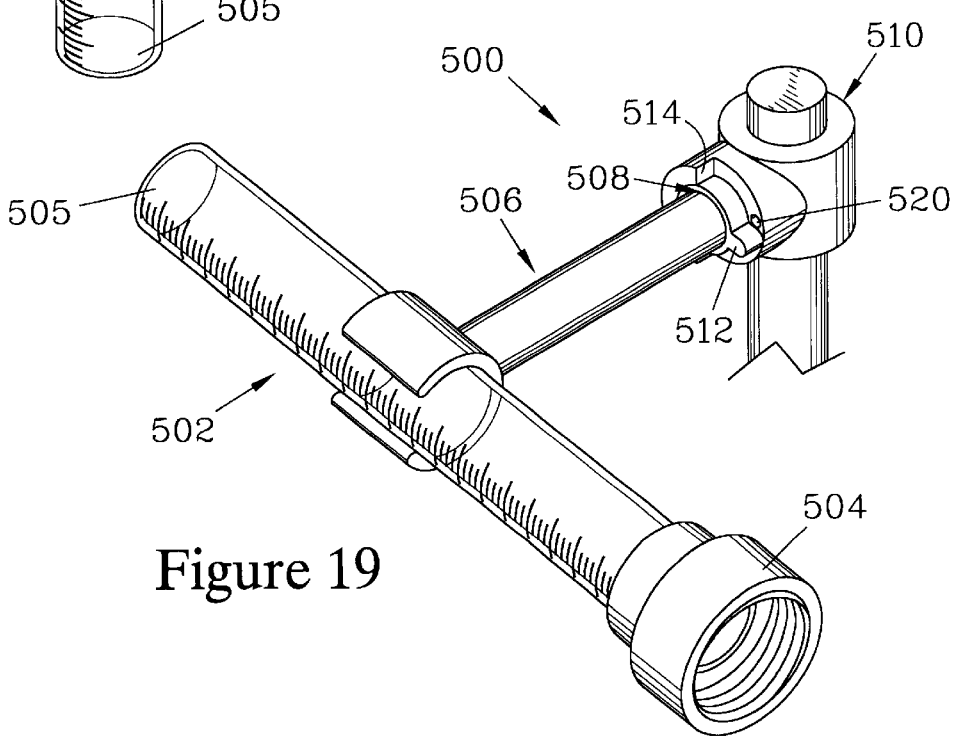
FIG. 19 shows the support shown in of FIG. 18, where the measuring tube is in one of its substantially non-vertical orientations.

FIGS. 18 and 19 are partial views which illustrate elements of a support 500 that could be employed in any of the embodiments discussed above to provide positive positioning of a measuring tube 502 having a container mount 504 attached thereto and having a first end 505 for attachment to a reservoir (not shown). The measuring tube 502 moves between either a first measuring orientation, as shown in FIG. 18, and a second measuring orientation, not shown, where the first end 505 resides above the container mount 504. The support 500 also facilitates halting the pivoting of the measuring tube 502 when the measuring tube 502 is in one of two substantially horizontal orientations, one of which is shown in FIG. 19. Halting the measuring tube 502 in either substantially horizontal orientations promotes the steady flow of liquid and air past each other without the use of a flow enhancement passage such as the flow enhancement passage 402 shown in FIG. 17.

The support 500 has a tube-supporting arm 506, which fixably engages the measuring tube 502. The tube-supporting arm 506 has an arm base end 508 which is pivotably engaged with a base portion 510 of the support 500. The arm base end 508 is provided with an indexing lug 512. The base portion 510 has a first stop surface 514 and a second stop surface 516 (shown in FIG. 18) formed thereon. The first stop surface 514 is positioned to be engaged by the indexing lug 512 to limit pivoting of the measuring tube 502 when the measuring tube 502 is in its first measuring orientation as shown in FIG. 18. Similarly, the second stop surface 516 is positioned to be engaged by the indexing lug 512 to limit pivoting of the measuring tube 502 when the measuring tube 502 is in its second measuring orientation.

To temporarily halt the pivoting of the measuring tube 502 when the measuring tube 502 is in one of its two substantially horizontal orientations, the arm base end 508 is provided with a spring plunger 518 (shown in FIG. 18). In this embodiment, the spring plunger 518 resides in the indexing lug 512. The base portion 510 of the support 500 is provided with a first detent recess 520 and a second detent recess 522 (shown in FIG. 18), each of which is configured to be engaged by the spring plunger 518. When the measuring tube 502 is pivoted from the first measuring orientation shown in FIG. 18, the spring plunger 518 is brought into engagement with the first detent recess 520 when the measuring tube 502 reaches its first substantially horizontal orientation. The engagement of the spring plunger 518 with the first detent recess 520 halts the pivoting of the measuring tube 502. The measuring tube 502 can be pivoted beyond this point by the operator, disengaging the spring plunger 518 from the first detent recess 520, and as the measuring tube 502 continues to pivot, the spring plunger 518 is brought into engagement with the second detent recess 522 when the measuring tube 502 reaches its second substantially horizontal orientation, shown in FIG. 19.

In either substantially horizontal orientation, liquid and displaced air are free to flow past each other in the measuring tube 502, thereby promoting flow of the liquid between the reservoir and the container. When the liquid ceases to flow, the measuring tube 502 can be further pivoted by the operator, disengaging the spring plunger 518 from the detent recess (520 or 522) to pivot the measuring tube 502 to its other measuring orientation. In the second substantially horizontal orientation illustrated in FIG. 19, a container (not shown) attached to the container mount 504 is positioned somewhat lower than a reservoir (not shown) attached to the first end 505 of the measuring tube 502, promoting steady flow of liquid and air past each other to facilitate the flow of the liquid from the reservoir to the container. Similarly, when the measuring tube 502 is in the first substantially horizontal orientation (not shown) where the spring plunger 518 is engaged with the first detent recess 520, the reservoir is positioned somewhat lower than the container, promoting steady flow of liquid and air past each other to facilitate the flow of the liquid from the container to the reservoir.

Figure 20:
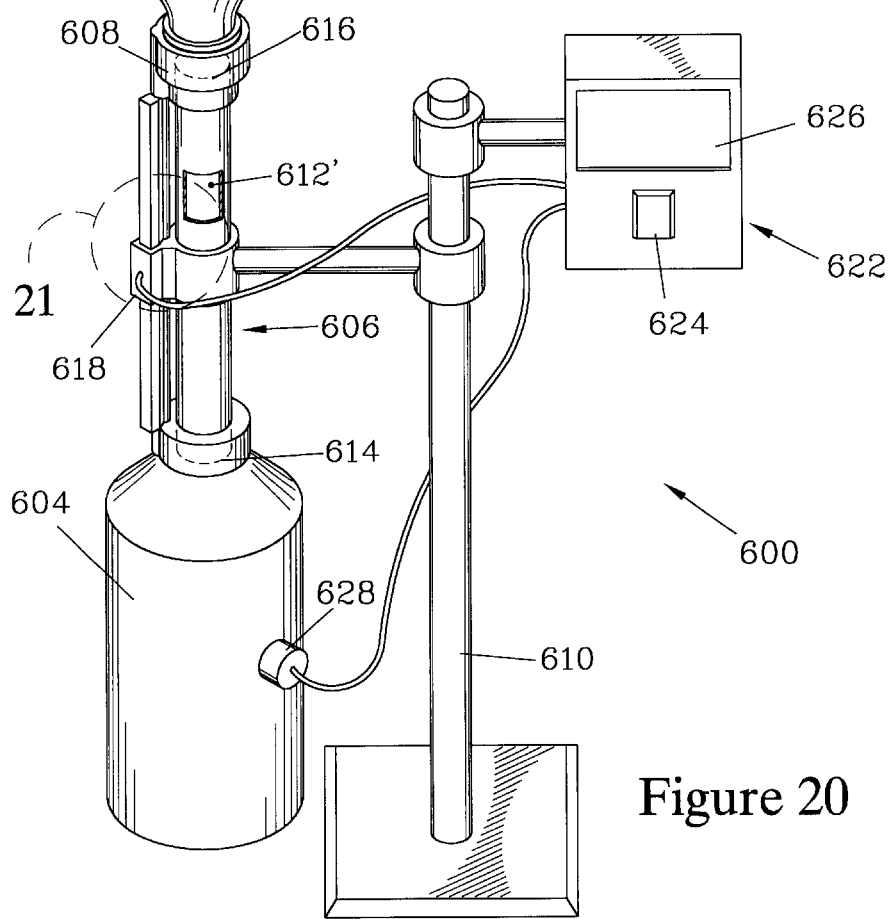
FIG. 20 is an isometric view of another embodiment of the present invention, where calculation of the volume of the container is performed automatically. The measurement of the height of liquid in the measuring tube is performed automatically by a sensor, which communicates with a microprocessor. A temperature sensor is provided in the reservoir, and the temperature sensor also communicates with the microprocessor. The microprocessor is programmed to record the output from these sensors and automatically calculate the volume of the container from the output. In this embodiment, the measuring tube passage has both a flow passage and a measurement passage, which is smaller in diameter to restrain a float employed by the sensor to measure the height of liquid in the measuring tube. In this embodiment, the flow tube is not transparent, and can be fabricated from a more rigid and durable material.

FIG. 20 illustrates a volume measuring device 600, which automates the calculation of the volume of a container 602. The volume measuring device 600 has a reservoir 604 having a known volume, a measuring tube 606 with a container mount 608, and a support 610.

Figure 21:
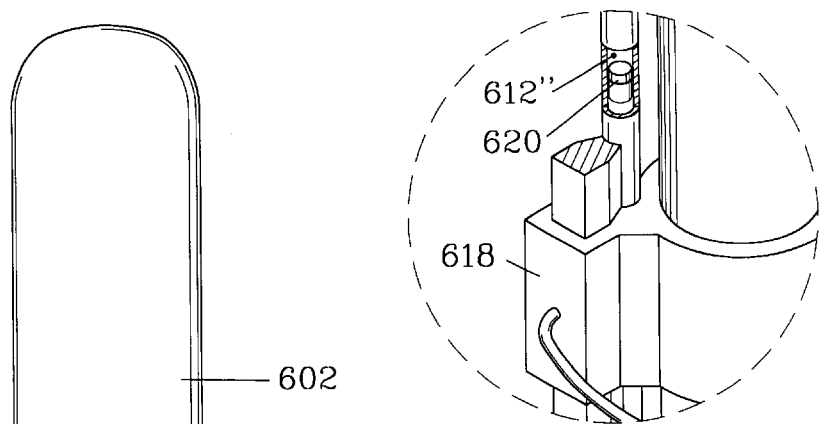
FIG. 21 is a detail view of the region 21 of FIG. 20, and is partially cut away to show the float which is employed to indicate to the sensor the level of liquid in the measuring tube.

The measuring tube 606 in this embodiment has dual measuring tube passages 612, including both a flow passage 612', extending between a first end 614 and a second end 616 of the measuring tube 606, and a measurement passage 612" (shown in FIG. 21) which extends alongside the flow passage 612' and communicates therewith at both ends. Thus, when the measuring tube 606 is in either of its measuring orientations, liquid is at the same height in the flow passage 612' and the measurement passage 612". Both the flow passage 612' and the measurement passage 612" preferably have constant diameters, and thus the height of liquid in the measuring tube passages 612 corresponds in a linear manner to the volume residing therein.

In the volume measuring device 600, an electronic sensor 618 is employed to measure the height of liquid in the measuring tube 612. The sensor 618 is positioned with respect to the measurement passage 612" to detect the height of liquid therein. There are a variety of sensors which can be readily employed. One option employs a float 620 (shown in FIG. 21) in the measurement passage 612" to facilitate the measurement of the liquid height by the sensor 618. The float 620 rides on the liquid and is configured to freely move along the measurement passage 612", while being constrained thereby so as to maintain a relatively constant orientation, and preferably slidably engages the measurement passage 612". The sensor 618 is selected such that it can sense the float 620 from which can be determined the liquid interface and report its position, the float 620 having properties which allow it to be readily detected by the particular sensor 618 employed. When the portion of the measuring tube 606 which contains the measurement passage 612" is transparent, an optical detector which monitors the position of the liquid interface can be employed as the sensor 618.

Figure 22:
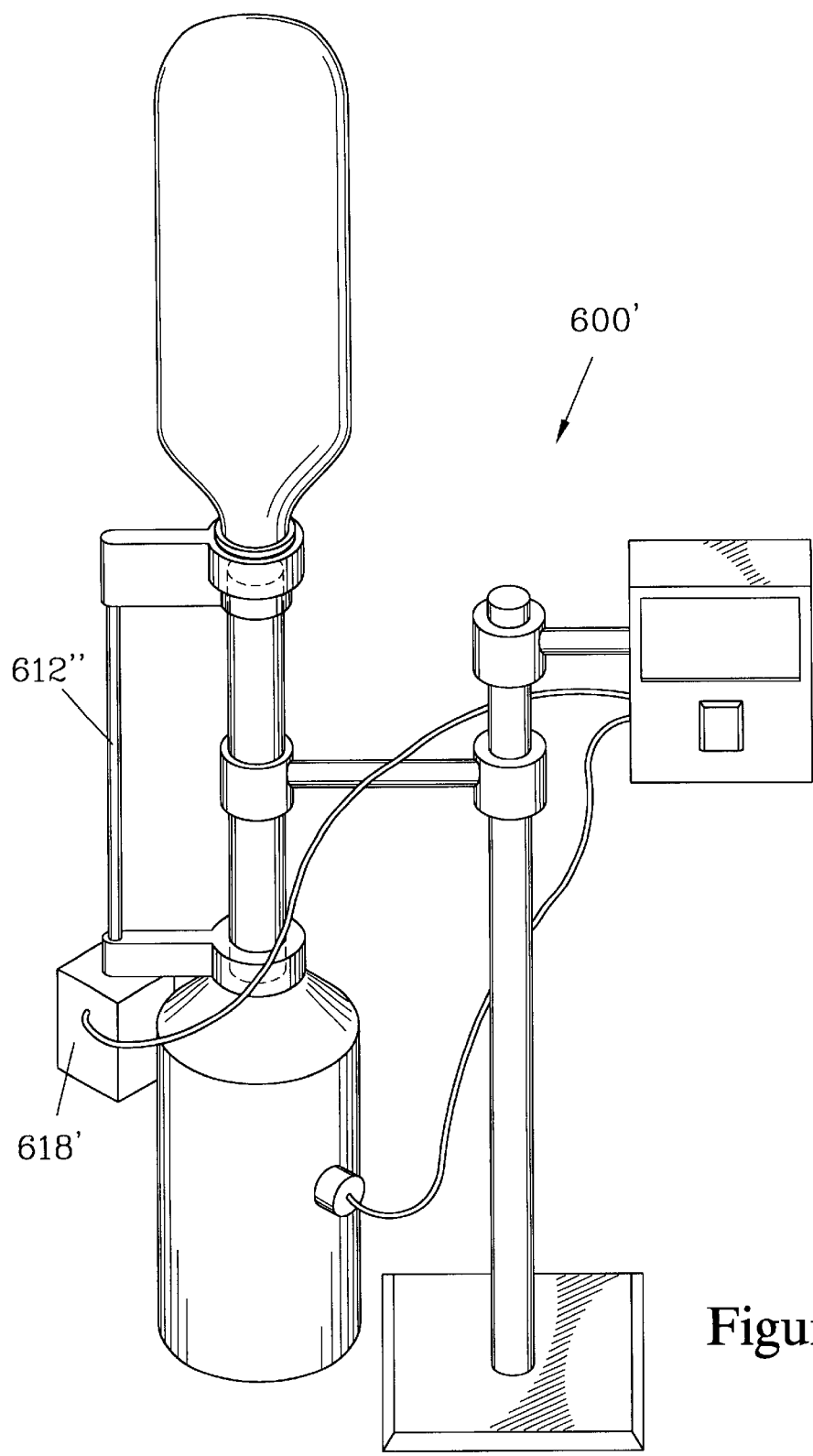
FIG. 22 is an isometric view of another automated embodiment of the present invention. This embodiment differs from that shown in FIG. 20 in the type of electronic sensor employed. In this embodiment, the electronic sensor is aligned with the measurement passage to detect the position of the liquid-air interface in the measuring tube passage.

Another alternative approach to determine the position of the liquid-air interface is employed in the volume measuring device 600' shown in FIG. 22. In the volume measuring device 600', the electronic sensor 618' is aligned with the measurement passage 612" to facilitate detection of the liquid-air interface. The electronic sensor 618' can emit a signal such as a laser beam parallel to the measurement passage 612". The signal is reflected by the liquid-air interface and, from such, the position of the interface is determined, which defines the relevant heights and corresponding volumes. Alternatively, the electronic sensor 618' can detect the position of the liquid-air interface by measuring capacitance, pressure, or other physical parameters which provide an indication of the position of the liquid-air interface.

While an electronic sensor 618 is employed in this embodiment, it should be noted that the use of a separate flow passage and measurement passage for the measuring tube passage has advantages in embodiments where the height of the liquid is measured visually. Indicia can be provided on the measurement passage, and the relatively small diameter of the measurement passage will make it easier for an individual to index the liquid surface with the indicia. Additionally, in such cases the flow passage need not be designed to allow viewing the liquid contained therein, and can be fabricated from a greater range of materials to provide increased strength.

When an electronic sensor is employed, the sensor 618 generates a signal (not shown) indicating the height of the liquid which is input into a microprocessor 622 and stored. The known volume of the reservoir 604 is also stored in the microprocessor 622. The microprocessor 622 can be mounted to the support 610 as shown for convenience.

When the measuring tube 606 is in its first measuring orientation, as illustrated, the operator can instruct the microprocessor 622 to record the current value of the height of liquid, for example by pushing a prompt key 624. The microprocessor 622 is programmed to convert the height measurement to a value for the volume of liquid contained in the measuring tube 606, and to store this value as a first tube volume value. This value may optionally be displayed on a display screen 626. The operator then pivots the measuring tube 606 to its second measuring orientation. Such can be done manually, or an electro-mechanical drive (not shown) controlled by the microprocessor 622 can act to pivot the measuring tube 606. The liquid flows from the reservoir 604 to the container 602, filling the measuring tube 606 to a new height. The operator instructs the microprocessor 622 to record the new current value of the height of liquid, by pushing the prompt key 624 again. The microprocessor 622 is programmed to store this value as a second tube volume value. The microprocessor 622 then uses these two volume values, in combination with the stored value for the known volume of the reservoir 604, to calculate the volume of the container 602. The volume is preferably displayed on the display screen 626.

One scheme for such a calculation is as follows. The microprocessor 622 first calculates a value for the difference in volume $\Delta V$, by subtracting the second tube volume value $V_{tube2}$ from the first tube volume value $V_{tube1}$.

$$\Delta V = V_{tube1} - V_{tube2} \quad \text{(Equation 3)}$$

The microprocessor 622 then adds the difference in volume $\Delta V$ to the known volume of the reservoir $V_{reservoir}$ to obtain the volume of the container $V_{container}$.

$$V_{container} = V_{reservoir} + \Delta V \quad \text{(Equation 6)}$$

When the volume measuring device 600 is employed for quality control purposes, the microprocessor 622 may also be programmed to compare the calculated volume of the container $V_{container}$ to a range of specified values, and to determine whether the volume $V_{container}$ falls within the specification. If the container 602 does not meet the specification, a warning of such is preferably provided to the operator. Additionally, after the microprocessor 622 has collected and stored the volume measurements for a series of sample containers 602, the microprocessor 622 can then provide statistical analysis of the type common to manufacturing operations.

In some situations, it is desirable to have the volume of the containers 602 calculated with respect to a standardized temperature. In such cases, when the reservoir 604 is fabricated from a material which expands and contracts significantly with changes in temperature, the volume measuring device 600 preferably includes a temperature sensor 628 positioned to report the temperature inside the reservoir 604. The output of the temperature sensor 628 is provided to the microprocessor 622, which can then use the temperature reading to compensate the calculated volume of the container for changes in the volume of the reservoir 604 due to thermal expansion and contraction. However, it is preferred for the reservoir to be formed of a material having negligible thermal expansion and contraction under normal operating temperatures, or a material having similar thermal expansion properties to those of the containers 602.

While the novel features of the present invention have been described in terms of particular embodiments and preferred applications, it should be appreciated by one skilled in the art that substitution of materials and modification of details obviously can be made without departing from the spirit of the invention.

What I claim is:

1. A container volume measuring device for measuring the volume of a container having a container rim, the device comprising:

a reservoir having an upper bounding surface and a known internal volume;

a measuring tube having a first end and a second end with a measuring tube passage extending therebetween, said measuring tube passage having a passage volume greater than the difference in volume between said known internal volume of said reservoir and a volume range of the containers to be tested, said first end of said measuring tube sealably attaching to and being positioned with respect to said upper bounding surface of said reservoir so as to connect said measuring tube passage with said known internal volume of said reservoir;

a container mount configured to sealably engage the container rim, said container mount attaching to said measuring tube and positioned such that, when the container is attached to said container mount, said second end of said measuring tube is positioned such that said measuring tube passage communicates with the container;

means for measuring the volume of liquid in said measuring tube; and a support pivotably supporting said measuring tube such that said measuring tube can be pivoted to move between,
  a first measuring orientation where said first end of said measuring tube is lower than said second end of said measuring tube, and
  a second measuring orientation where said first end of said measuring tube is elevated above said second end of said measuring tube.

2. The container volume measuring device of claim 1 wherein said known internal volume of said reservoir is comparable to the volume of the container.

3. The container volume measuring device of claim 2 wherein said measuring tube is substantially vertical when in said first measuring orientation and when in said second measuring orientation.

4. The container volume measuring device of claim 2 wherein said first end of said measuring tube resides at said upper bounding surface of said reservoir.

5. The container volume measuring device of claim 2 wherein said measuring tube passage has a constant cross section and said measuring tube has a viewing window such that the level of liquid residing in said measuring tube passage can be observed visually, further wherein said means for measuring the volume of liquid in said measuring tube further comprises:
  indicia on said viewing window which correlate height of liquid to volume.

6. The container volume measuring device of claim 2 wherein said measuring tube further comprises:
  a flow passage extending between said first end and said second end; and
  a measurement passage smaller in diameter than said flow passage and extending substantially therealong.

7. The container volume measuring device of claim 5 wherein said measuring tube further comprises:
  a flow passage extending between said first end and said second end; and
  a measurement passage smaller in diameter than said flow passage and extending substantially therealong, said viewing window being provided on said measurement passage.

8. The container volume measuring device of claim 2 further comprising:
  means for promoting steady flow of liquid and air past each other through said measuring tube.

9. The container volume measuring device of claim 8 wherein said means for promoting steady flow of liquid and air past each other through said measuring tube is a flow enhancement passage which extends into said reservoir.

10. The container volume measuring device of claim 8 wherein said means for promoting steady flow of liquid and air past each other through said measuring tube is a mechanical drag mechanism on said support to allow said measuring tube to be held in at least one substantially horizontal orientation.

11. The container volume measuring device of claim 8 wherein said means for promoting steady flow of liquid and air past each other through said measuring tube is an electro-mechanical drive for moving said measuring tube between said first measuring orientation and said second measuring orientation, said electro-mechanical drive maintaining said measuring tube substantially horizontal for a period of time.

12. The container volume measuring device of claim 2 wherein the volume measuring device has capacity to measure a plurality of containers having various container configurations including a number of container rim configurations which differ, said container mount further comprising:
  a plurality of rim adaptors, each configured to sealably engage a corresponding one of the plurality of container rim configurations and to engage said container mount thereby sealing the rims of the containers with respect to said container mount.

13. The container volume measuring device of claim 2 wherein the volume measuring device is suitable to measure a plurality of containers having distinct container configurations having a number of standard container volumes which differ, the container volume measuring device further comprising:
  means for adjusting said known internal volume of said reservoir.

14. The container volume measuring device of claim 13 wherein said means for adjusting said known internal volume of said reservoir further comprises:
  a matched set of reservoirs corresponding to the standard container volumes; and
  a reservoir coupling attached to said first end of said measuring tube and configured to sealably engage each of said reservoirs of said matched set.

15. The container volume measuring device of claim 12 wherein the distinct container configurations have a number of standard container volumes which differ, the container volume measuring device further comprising:
  means for adjusting said known internal volume of said reservoir.

16. The container volume measuring device of claim 2 wherein the volume measuring device is intended to measure FLV volume of a container having a defined fill line plane, further wherein said second end of said measuring tube is positioned with respect to said container mount such that said second end resides at the fill line plane of the container when the container is attached to said container mount, the volume measuring device further comprising:
  a drain passage extending between said container mount and said measuring tube passage; and
  a drain valve which selectively closes said drain passage.

17. The container volume measuring device of claim 2 wherein said measuring tube passage has a constant cross section, further wherein said means for measuring the volume of liquid in said measuring tube further comprises:
  an electronic sensor which monitors the position of the air-liquid interface in said measuring tube passage; and
  a microprocessor communicating with said electronic sensor to convert said monitored position of the air-liquid interface into a value for the volume of liquid residing in said measuring tube passage.

18. The container volume measuring device of claim 17 wherein said electronic sensor is positioned in alignment with said measuring tube passage.

19. A method for measuring the volume of a container, the method comprising the steps of:
  providing a measuring tube connected at one end to a reservoir of known volume;

filling the reservoir and the measuring tube with liquid such that the liquid partially fills the measuring tube;

measuring a first excess volume of liquid in the measuring tube when the measuring tube is oriented such that the reservoir resides substantially below the measuring tube, the first excess volume of liquid in the measuring tube corresponding to the total volume of liquid;

mounting the container to the measuring tube so as to communicate with the end of the measuring tube that is not connected to the reservoir;

pivoting the container, the measuring tube, and the reservoir to elevate the reservoir substantially above the container;

measuring a second excess volume of liquid in the measuring tube; and calculating the volume of the container from said first excess volume, said second excess volume, and said known volume of the reservoir.

20. The method of claim 19 wherein the measuring tube has a constant internal cross section such that the height of liquid in the measuring tube is proportional to the volume contained therein, further wherein, said step of measuring a first excess volume of liquid in the measuring tube further comprises:

measuring a first height of liquid in the measuring tube when the measuring tube is oriented such that the reservoir resides substantially below the measuring tube;

still further wherein said step of measuring a second excess volume of liquid in the measuring tube further comprises:

measuring a second height of liquid in the measuring tube when the measuring tube is oriented such that the reservoir resides substantially above the container.

* * * * *